(12) United States Patent
Yamada et al.

(10) Patent No.: US 8,870,287 B2
(45) Date of Patent: Oct. 28, 2014

(54) SEAT RECLINING DEVICE FOR VEHICLE

(75) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/125,420

(22) PCT Filed: Jun. 11, 2012

(86) PCT No.: PCT/JP2012/064866
§ 371 (c)(1),
(2), (4) Date: Dec. 11, 2013

(87) PCT Pub. No.: WO2012/173070
PCT Pub. Date: Dec. 20, 2012

(65) Prior Publication Data
US 2014/0125105 A1    May 8, 2014

(30) Foreign Application Priority Data
Jun. 13, 2011    (JP) .................................. 2011-131470

(51) Int. Cl.
*B60N 2/235*    (2006.01)

(52) U.S. Cl.
CPC .............. *B60N 2/235* (2013.01); *B60N 2/2356* (2013.01)
USPC .................................................... 297/367 L

(58) Field of Classification Search
USPC .......................................... 297/367 R, 367 L
See application file for complete search history.

(56) References Cited

U.S. PATENT DOCUMENTS

| | | | |
|---|---|---|---|
| 6,648,413 | | 11/2003 | Uramichi |
| 6,722,738 | B2 * | 4/2004 | Uramichi .................. 297/367 R |
| 6,758,525 | B2 | 7/2004 | Uramichi |
| 7,097,251 | B2 | 8/2006 | Uramichi |
| 7,100,987 | B2 * | 9/2006 | Volker et al. ............... 297/367 R |
| 7,360,838 | B2 * | 4/2008 | Smuk ......................... 297/367 R |
| 7,677,667 | B2 * | 3/2010 | Peters et al. .............. 297/367 R |

(Continued)

FOREIGN PATENT DOCUMENTS

| | | |
|---|---|---|
| JP | 3804431 | 8/2006 |
| JP | 2006 288741 | 10/2006 |
| JP | 2007 29440 | 2/2007 |

OTHER PUBLICATIONS

International Search Report Issued Jul. 17, 2012 in PCT/JP12/064866 Filed Jun. 11, 2012.

*Primary Examiner* — Peter Brown

(74) *Attorney, Agent, or Firm* — Oblon, Spivak, McClelland, Maier & Neustadt, L.L.P.

(57) ABSTRACT

An engagement section of a pole and a protruding section of an upper arm restrict movement of the pole outward in the radial direction and disable meshing of outer teeth and inner teeth, when the relative rotation angle of a lower arm and the upper arm is within a prescribed range. Outer teeth and the inner teeth of poles cannot engage as a result of the restriction on movement of the pole outward in the radial direction. The amount of movement by the poles separating from the inner teeth along the radial direction is set so as to be greater than the amount of movement by the pole separating from the inner teeth along the radial direction, when the pole reaches a position corresponding to where the outer teeth and the inner teeth cannot mesh as a result of the protruding section, etc., during the unlock operation.

8 Claims, 9 Drawing Sheets

(56) References Cited

U.S. PATENT DOCUMENTS

| | | | |
|---|---|---|---|
| 8,002,353 B2 * | 8/2011 | Yamada et al. | 297/366 |
| 8,297,704 B2 * | 10/2012 | Endo et al. | 297/367 L |
| 8,602,498 B2 * | 12/2013 | Yamada et al. | 297/367 L |
| 8,651,578 B2 | 2/2014 | Yamada et al. | |
| 8,708,412 B2 * | 4/2014 | Berndtson et al. | 297/367 L |
| 8,720,999 B2 * | 5/2014 | Peters | 297/367 P |
| 2008/0093903 A1 | 4/2008 | Fujioka et al. | |
| 2009/0224583 A1 | 9/2009 | Nagura et al. | |
| 2009/0243361 A1 * | 10/2009 | Tarusawa et al. | 297/362 |
| 2012/0217782 A1 | 8/2012 | Yamada et al. | |

* cited by examiner

SEAT RECLINING DEVICE FOR VEHICLE

FIELD OF THE INVENTION

The present invention relates to a vehicle seat reclining device for adjusting the inclination angle of a seat back relative to a seat cushion.

BACKGROUND OF THE INVENTION

Patent Literature 1 describes an example of a conventional seat reclining device for use in a vehicle. This vehicle seat reclining device includes a fixed disk (11), which has guide grooves (11c), a movable disk (12), which has internal teeth and which is axially supported on the fixed disk, a plurality of poles (15A to 15D), cam bodies (16, 18), and an unlock member (19). The guide grooves guide the corresponding poles (15A to 15D) in the radial direction. Each pole (15A to 15D) has external teeth (15b), which can be engaged with and disengaged from the internal teeth, a cam pin (15e), which extends from the pole, and a locking-side pole cam portion (15f), which is formed on an inner circumferential side of the pole. The cam bodies (16 and 18) press the poles outwardly as they rotate in one direction to engage the internal teeth with the external teeth. The cam bodies (16 and 18) pull the poles inwardly as they rotate in the other direction to disengage the internal teeth from the external teeth. The unlock member (19) is coupled to the movable disk (12) and integrally rotated with the disc. The unlock member (19) is engaged with the first pole (15A) of the four poles when the relative angles of rotation of the fixed disk and the movable disk are within a predetermined range (hereafter, this range is referred to as an unlocking section). This prohibits engagement of the internal teeth and the external teeth. The rotation restriction of the cam bodies prohibits engagement of the internal teeth and the external teeth in the three second poles (15B to 15D) among the four poles.

More specifically, each cam body includes a cam (16) and a release plate (18), which are coupled together so as to rotate integrally. The cam (16) includes a plurality of locking-side cam portions (16b to 16d), which are formed on the outer circumference of the cam. The release plate (18) includes an unlocking-side cam portion (18d), which forms an elongated hole. The locking-side cam portions (16b to 16d) of the cam body press the locking-side pole cam (15f) as the cam body rotates in one direction and engages the internal teeth with the external teeth. This restricts relative rotation of the fixed disk and the movable disk, and restricts rotation of the seat back relative to the seat cushion.

The unlocking-side cam portion (18d) of the cam body pulls the cam pin (15e) as the cam body rotates in the other direction. This disengages the internal teeth from the external teeth. As a result, relative rotation of the fixed disk and the movable disk is permitted, and rotation of the seat back relative to the seat cushion is permitted.

The above structure allows the seat back to be adjusted and retained at a predetermined angle of inclination that is optimum for a passenger seating.

The unlock member includes a restriction unit (19c), which extends in the circumferential direction. The restriction unit forms an elongated hole including steps. The restriction unit includes a wide-hole part (19c1) and a narrow-hole part (19c2), which have different opening widths in the radial direction. When the relative rotation angles of the fixed disk and the movable disk are within a locking section that is outside the unlocking section, the wide-hole part is set on the cam pin of the first pole. The cam pin is permitted to move in the radially outward direction without interfering with the wide-hole part. This allows the external teeth of the first pole to be engaged with the internal teeth. At the same time, by permitting rotation of the cam and the release plate of each second pole, engagement of the external teeth of the second pole with the internal teeth is permitted.

The restriction unit is set in a manner that the narrow-hole part is arranged on the cam pin of the first pole when the relative rotation angles of the fixed disk and the movable disk are within the unlocking section. The cam pin of the first pole comes in contact with and interferes with the narrow-hole part to restrict the movement of the cam pin in the radially outward direction. This prohibits engagement of the external teeth of the first pole with the internal teeth. At the same time, by restricting the rotation of the cam and the release plate, the external teeth of each of the three second poles with the internal teeth is prohibited. More specifically, each second pole is engaged with the release plate, of which rotation is restricted, to avoid contact of the external teeth of each second pole with the internal teeth. As described above, a specific pole (first pole) can be solely engaged with the unlock member to prohibit engagement of the external teeth of the specific pole (first pole) with the internal teeth, as well as prohibit engagement of, through the release plate, the external teeth of each of the other poles (second poles) with the internal teeth. If, for example, all the poles are equally engaged with the unlock member to prohibit engagement of the external teeth of each pole with the internal teeth, the unlocking section would be enlarged and the range of angles at which the seat back can be arranged would be narrowed.

Patent Literature 1: Japanese Patent No. 3804431

DISCLOSURE OF THE INVENTION

In Patent Literature 1, when the cam pin of the specific pole (first pole) is in contact with the narrow-hole part of the unlock member and cannot be locked, the cam pin of each of the other poles (second poles) comes in contact with the unlocking-side cam portion of the release plate. In this state, the poles cannot be locked. In other words, the movement of each second pole is restricted indirectly by the release plate, of which rotation is restricted by the restricted movement of the first pole. Manufacturing variations or assembling variations may cause deviations in the postures of the first pole and the second pole at positions where they cannot be locked. In particular, if the posture of the second pole relative to the first pole deviates toward the locking-side, or specifically in a direction in which the external teeth of the second pole approach the internal teeth, the tips of the external teeth and the tips of the internal teeth may interfere with each other and disturb smooth operations. When shifting from the unlocking section to the locking section, the external teeth of each second pole may be engaged with the internal teeth earlier than the external teeth of the first pole. When the poles are locked, the external teeth of each second pole are engaged with teeth at positions more frontward from the intended corresponding internal teeth.

It is an object of the present invention to provide a vehicle seat reclining device that reduces interference between the tips of external teeth of a pole, of which movement is restricted indirectly, and the tips of internal teeth.

To solve the above problem, the invention described in claim 1 is a vehicle seat reclining device arranged on a vehicle seat including a seat cushion and a seat back. The vehicle seat reclining device includes a first arm fixed to one of the seat cushion and the seat back of the vehicle seat. The first arm includes a plurality of guide grooves. A second arm is fixed to the other one of the seat cushion and the seat back of the vehicle seat and supported by the first arm in a rotatable manner. The second arm includes internal teeth. First and second poles are respectively guided by the plurality of guide grooves to be movable in a radial direction. Each of the first and second poles includes external teeth that are engageable with and disengageable from the internal teeth of the second arm. A cam body is engaged with the first and second poles. The cam body presses the first and second poles outwardly during a locking operation performed when rotated in a first direction to engage the internal teeth with the external teeth. The cam body pulls the first and second poles inwardly during an unlocking operation performed when rotated in a second direction to disengage the internal teeth from the external teeth. A restricting member is arranged between the first pole and the second arm. The restricting member restricts radially outward movement of the first pole when a relative rotation angle of the first arm and the second arm is within a predetermined range to prohibit engagement of the external teeth of the first pole and the internal teeth. When the restricting member restricts radially outward movement of the first pole and restricts rotation of the cam body, engagement of the external teeth with the internal teeth is prohibited in the second pole. When the first pole reaches a position corresponding to an engagement prohibition state of the external teeth and the internal teeth caused by the restricting member during an unlocking operation, a movement amount by which the second pole moves away from the internal teeth in the radial direction is set to be greater than a movement amount by which the first pole moves away from the internal teeth in the radial direction.

In this structure, when the relative rotation angles of the first arm and the second arm are outside the predetermined range, the cam body presses the plurality of poles outwardly during the locking operation performed when the cam body rotates in one direction. This causes the external teeth of each pole to be engaged with the internal teeth. As a result, relative rotation of the first arm and the second arm is restricted, and rotation of the seat back relative to the seat cushion is restricted. The cam body pulls the plurality of poles inwardly during the unlocking operation performed when the cam body rotates in the other direction. This disengages the engagement between the internal teeth and the external teeth. As a result, relative rotation of the first arm and the second arm is permitted, and the seat back is permitted to rotate relative to the seat cushion. This structure thus allows the seat back to be adjusted and retained at a predetermined angle of inclination that is optimum for a passenger seating.

When the relative rotation angles of the first arm and the second arm are within the predetermined range, the restricting member restricts movement of the first pole in the radially outward direction, and prohibits engagement of the external teeth of the first pole with the internal teeth. At the same time, movement of the second pole is restricted indirectly in the radially outward direction by the cam body, of which rotation is restricted by the restricted movement of the first pole in the radially outward direction. This prohibits engagement of the external teeth of the second pole with the internal teeth. In this structure, even when the cam body presses the plurality of poles outwardly, the external teeth of all of the poles are prohibited from engaging with the internal teeth. This maintains the state permitting rotation of the seat back relative to the seat cushion.

When the first pole reaches the position corresponding to the engagement prohibition state of the external teeth and the internal teeth caused by the restricting member during the unlocking operation, the amount of radial movement of the second pole away from the internal teeth is larger than the amount of radial movement of the first pole away from the internal teeth. The difference between the movement amounts absorbs positional deviation of the second pole in the radial direction toward the internal teeth due to manufacturing variations or assembling variations. This thus reduces interference between the tips of the external teeth of the second pole and the tips of the internal teeth and allows for smooth operations.

The invention of claim 2 is the vehicle seat reclining device according to claim 1, in which a distance by which the second pole moves away in the radial direction from the internal teeth when the first pole is in the engagement prohibition state of the external teeth and the internal teeth due to the restricting member during a locking operation is set to be larger than a distance by which the first pole moves away in the radial direction from the internal teeth.

This structure suppressed, in a further reliable manner, the second pole, of which movement in the radially outward direction (toward the internal teeth) is indirectly restricted by the cam body, from being positioned more outwardly in the radial direction than the first pole when the restricting member prohibits engagement of the external teeth of the first pole with the internal teeth during the locking operation. Further, interference between the external teeth of the second pole and the internal teeth may be suppressed.

The invention of claim 3 is the vehicle seat reclining device according to claim 2, in which an angle difference is set between the rotation angle of the cam body when the cam body starts pressing the first pole and the rotation angle of the cam body when the cam body starts pressing the second pole to delay operation of the second pole from operation of the first pole during the locking operation.

In this structure, for example, if the amount the first pole and the second pole move in the radial movement away from the internal teeth is the same when the cam body starts pressing the first and second poles during the locking operation performed to shift from the unlocked state, the movement amounts of the first and second poles may be set to be proportional to the rotation angle of the cam body. The above structure prevents the second pole from being positioned more outwardly in the radial direction than the first pole when the restricting member prohibits engagement of the external teeth of the first pole with the internal teeth. Thus, simple engagement between each of the first pole and the second pole with the cam body may suppress interference between the external teeth of the second pole and the internal teeth during the locking operation when the restricting member prohibits engagement of the external teeth of the first pole with the internal teeth.

The invention of claim 4 is the vehicle seat reclining device according to claim 2 or 3, in which the rotation angle of the cam body when the first pole is in the engagement prohibition state of the external teeth and the internal teeth due to the restricting member during the locking operation is greater than or equal to the rotation angle of the cam body when the second pole reaches a position of the first pole corresponding to the engagement prohibition state of the external teeth and the internal teeth caused by the restricting member during the unlocking operation.

In this structure, when the first pole is in the engagement prohibition state of the external teeth and the internal teeth due by the restricting member during the locking operation, the second pole is allowed to move radially toward the internal teeth only to the position of the first pole corresponding to the engagement prohibition state of the external teeth and the internal teeth. This suppresses interference between the external teeth of the second pole and the internal teeth in a further reliable manner when the first pole is in the engagement prohibition state of the external teeth and the internal teeth caused by the restricting member.

The term "being equal to the rotation angle of the cam body" in the claim does not necessarily mean "completely being equal" but includes "approximating." More specifically, the rotation angle of the cam body corresponding to the engagement prohibition state of the external teeth and the internal teeth caused by the restricting member during the locking operation may be slightly smaller than the rotation angle of the cam body when the second pole reaches the position of the first pole corresponding to the engagement prohibition state of the external teeth and the internal teeth caused by the restricting member during the unlocking operation.

The invention of claim 5 is the vehicle seat reclining device according to any one of claims 2 to 4, in which the rotation angles of the cam body corresponding to the amounts by which the first pole and the second pole move away from the internal teeth in the radial direction converge and become equal at a point of time when tips of the external teeth of each of the first pole and the second pole are engaged with tips of the internal teeth.

In this structure, the rotation angles of the cam body corresponding to the amount the first and second poles move away in the radial direction from the internal teeth converge and become equal when the external teeth of the first pole and the second pole are engaged with the internal teeth during the locking operation. This allows the external teeth of both the first and second poles to be engaged with the internal teeth at the same time, and suppresses the first pole or the second pole from being engaged with teeth at positions differing from the intended corresponding internal teeth.

The term "becoming equal at a timing when the external teeth of each of the first pole and the second pole are engaged with the internal teeth" in the claim does not necessarily mean "completely becoming equal" but includes "approximating."

The invention of claim 6 is the vehicle seat reclining device according to any one of claims 1 to 5, in which the first pole includes a first unlocking-side pole cam portion. The second pole includes a second unlocking-side pole cam portion. Further, the cam body includes a cam engaged with the first and second poles. The cam presses each of the first and second poles outwardly during rotation in the first direction and engages the internal teeth with the external teeth. A release plate is coupled to the cam to rotate integrally with the cam. A first unlocking-side cam portion is formed on the cam. The first unlocking-side cam portion pulls the first unlocking-side pole cam portion of the first pole during rotation in the second direction and disengages the external teeth of the first pole from the internal teeth. A second unlocking-side cam portion is formed on the release plate. The second unlocking-side cam portion pulls the second unlocking-side pole cam portion of the second pole during rotation in the second direction to disengage the external teeth of the second pole from the internal teeth.

In this structure, the first unlocking-side cam portion pulls the first unlocking-side pole cam portion to disengage the external teeth of the first pole from the internal teeth as the cam rotates in the other direction. The second unlocking-side cam portion pulls the second unlocking-side pole cam to disengage the external teeth of the second pole from the internal teeth as the release plate rotates in the other direction integrally with the cam. In this manner, the second pole is disengaged by the release plate. This simplifies the engagement structure between the second pole and the cam.

The invention of claim 7 is the vehicle seat reclining device according to any one of claims 1 to 5. The first pole includes a first hooked portion, the second pole includes a second hooked portion, and the cam body includes a plate-shaped cam. The cam includes a first hook and a second hook that disengage the external teeth of each of the first and second poles from the internal teeth by respectively hooking the first hooked portion of the first pole and the second hooked portion of the second pole during rotation in the second direction.

This structure enables the cam (cam body) to solely cause the external teeth of the plurality of poles to be engaged with or disengaged from the internal teeth by simply switching the direction of rotation of the cam. This reduces the number of components.

The invention of claim 8 is a seat reclining device for use in a vehicle including a seat cushion and a seat back. The seat reclining device includes a first arm fixed to one of the seat cushion and the seat back. The first arm includes a plurality of guide grooves and is circular. A second arm is fixed to the other one of the seat cushion and the seat back and supported by the first arm in a rotatable manner. The second arm includes first teeth. First and second poles are respectively guided by the plurality of guide grooves to move in a radial direction of the first arm. Each of the first and second poles includes second teeth that are engageable with and disengageable from the first teeth of the second arm. A cam body is supported by the second arm in a rotatable manner. The cam body is engaged with the poles, and the cam body moves to a lock position when rotated in a first direction, at which the first teeth is engaged with the second teeth by pressing the poles outwardly in the radial direction of the first arm, and an unlock position when rotated in a second direction that differs from the first direction, at which the first teeth is disengaged from the second teeth by moving the poles inward in the radial direction of the first arm. A restricting member is arranged between the first pole and the second arm. The restricting member restricts outward movement of the first pole in the radial direction of the first arm when a relative rotation angle of the first arm and the second arm is within a predetermined range to prohibit engagement of the first teeth and the second teeth. When outward movement of the first pole in the radial direction of the first cam is restricted, movement of the cam body is restricted, and engagement of the second teeth of the second pole with the first teeth is prohibited. When the cam body moves to the unlock position and the first pole reaches a position corresponding to an engagement prohibition state of the first teeth and the second teeth caused by the restricting member, a movement amount of the second pole by which the second pole moves away from the first teeth in the radial direction of the first arm is set to be greater than a movement amount of the first pole by which the first pole moves away from the first teeth in the radial direction.

This structure has the same advantages as the invention in claim 1.

The present invention provides a vehicle seat reclining device that reduces interference between the tips of the external teeth of the pole, of which movement is restricted indirectly, and the tips of the internal teeth.

EMBODIMENTS OF THE INVENTION

First Embodiment

Figure 1:
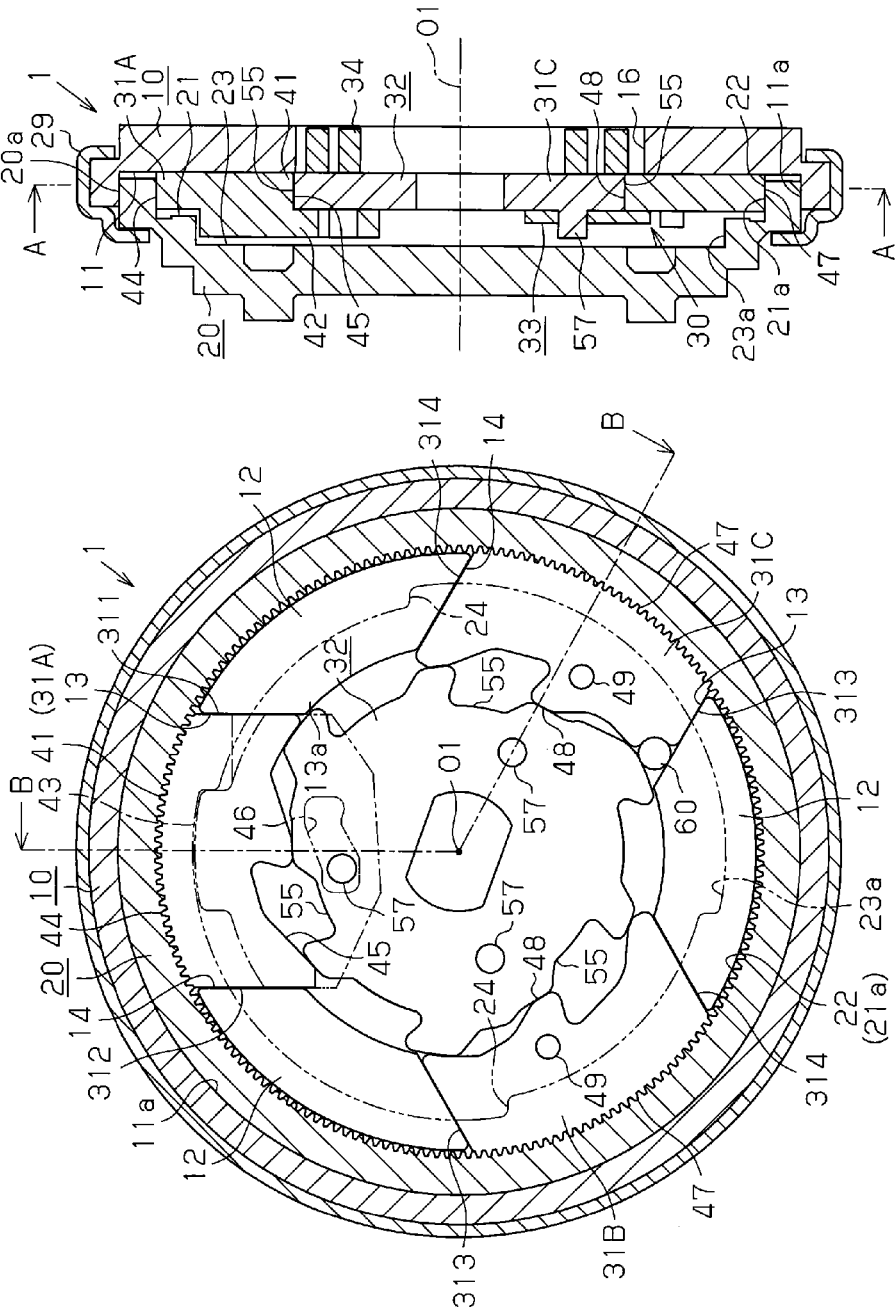
FIGS. 1A and 1B are a horizontal cross-sectional view and a vertical cross-sectional view illustrating a first embodiment of the present invention.
Figure 9:
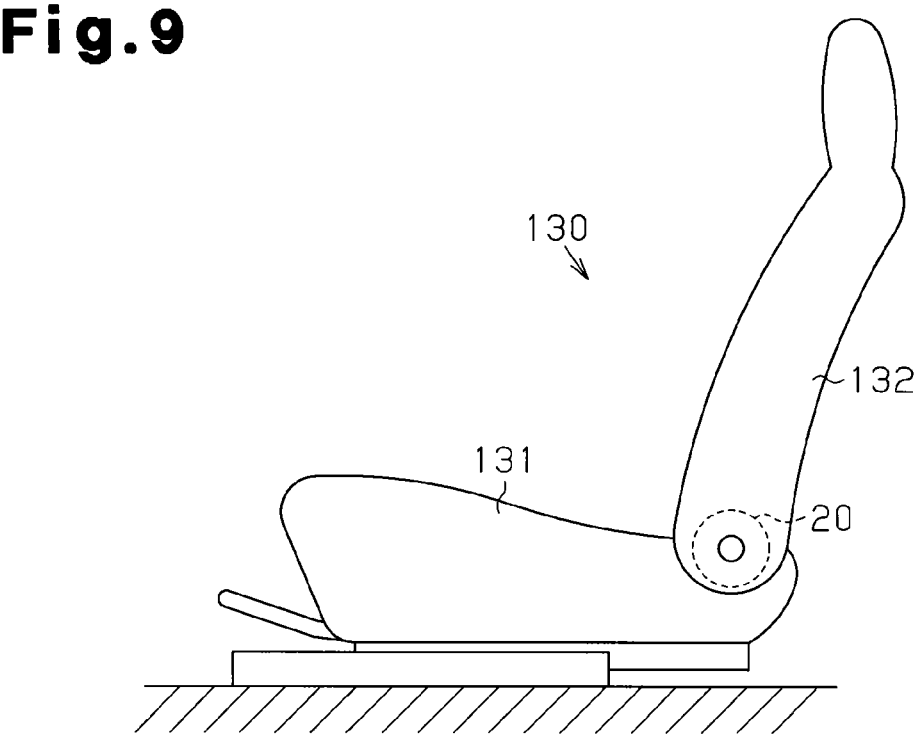
FIG. 9 is a side view of a vehicle seat to which the present invention is applied.

A vehicle seat reclining device according to a first embodiment of the present invention will now be described with reference to FIG. 1A to FIG. 5 and FIG. 9. As shown in FIGS. 1A and 1B, the vehicle seat reclining device 1 includes a disk-shaped or circular lower arm 10, which functions as a first arm, and a disk-shaped upper arm 20, which functions as a second arm. The vehicle seat reclining device 1 is arranged on a vehicle seat 130. As shown in FIG. 9, the vehicle seat 130 includes a seat cushion 131, which forms a seat, and a seat back 132, which forms a back. The lower arm 10 is fixed to the seat cushion 131 of the vehicle seat 130. The upper arm 20 is fixed to the seat back 132 of the vehicle seat 130.

The lower arm 10 is formed by, for example, performing half blanking on a metal plate. The lower arm 10 includes a circular recess 11, which is open toward the upper arm 20. The recess 11 has an inner circumferential surface 11a, of which the center is the rotation axis O1 (axis) of the lower arm 10 and the upper arm 20.

Figure 2:
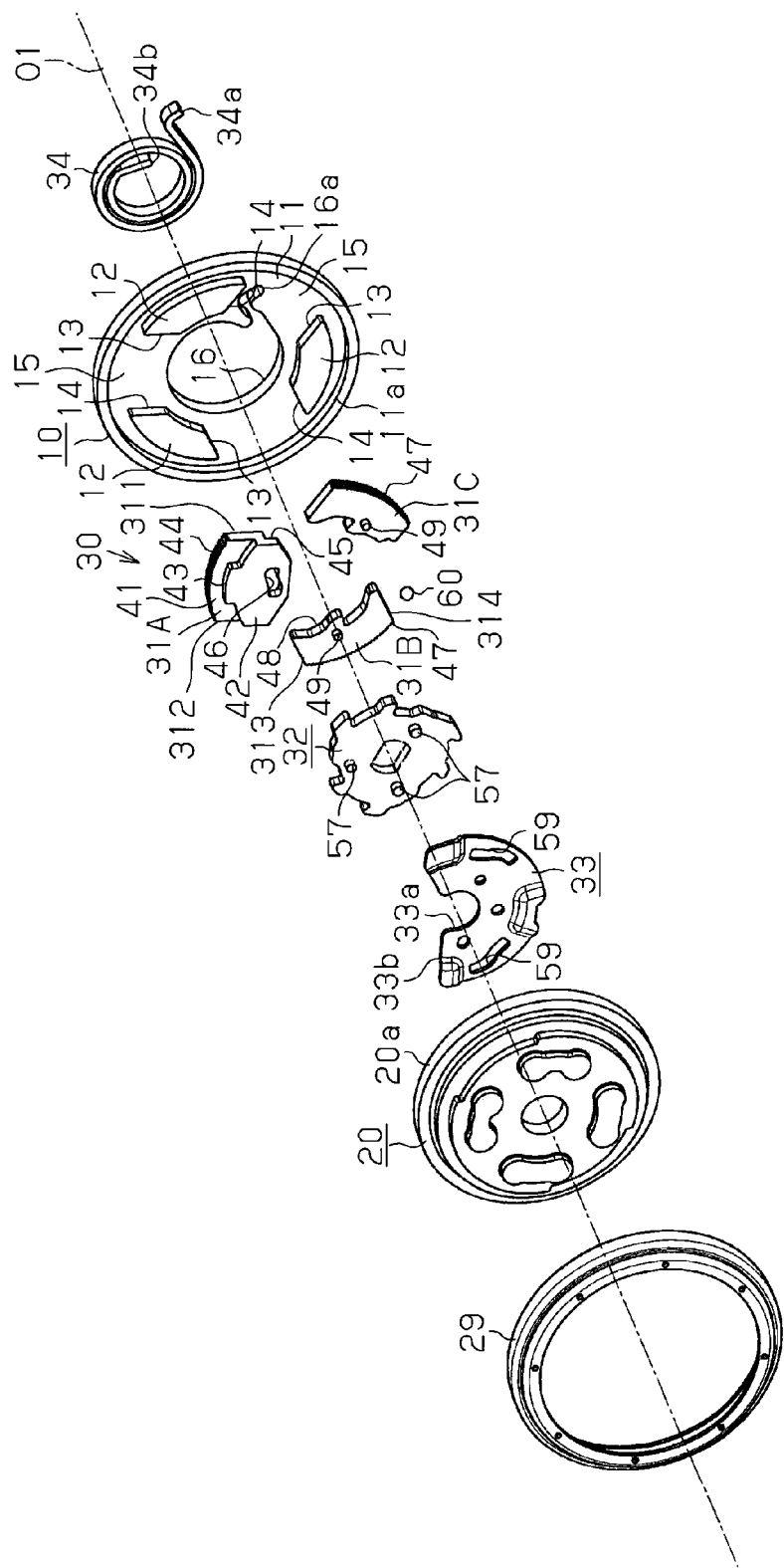
FIG. 2 is an exploded perspective view illustrating the first embodiment of the present invention.

As shown in FIG. 2, the recess 11 of the lower arm 10 includes three substantially sectoral protrusions 12 arranged at equal angular intervals in the circumferential direction. Each protrusion 12 has two guide walls 13 and 14 in the circumferential direction. The two opposing guide walls 13 and 14 of the adjacent protrusions 12 in the circumferential direction extend parallel to each other in the radial direction about the rotation axis O1. Together with the bottom surfaces of the recesses 11, the six guide walls 13 and 14 define three substantially U-shaped guide grooves 15, which are arranged at equal angular intervals in the circumferential direction and extend in the radial direction about the rotation axis O1. The three guide grooves 15 communicate with one another at the central portion in a substantially Y-shaped manner as a whole.

A substantially circular through-hole 16 is formed in the center of the lower arm 10, where the three guide grooves 15 communicate with one another. The through-hole 16 includes an engagement hole 16a, which extends radially outwardly at a predetermined angular position.

The upper arm 20 is formed by, for example, performing half blanking on a metal plate. The upper arm 20 has an upper circumferential surface 20a, which has an outer diameter equal to an inner diameter of the inner circumferential surface 11a of the lower arm 10. As shown in FIG. 1B, the upper arm 20 includes a circular recess 21, which is open toward the lower arm 10. The recess 21 has an inner circumferential surface 21a, of which the center is the rotation axis O1. First teeth (internal teeth) 22 are formed on the entire circumference of the inner circumferential surface 21a of the recess 21.

A circular recess 23 is formed at the inner side of the recess 21. The recess 23 is concentric with the recess 21. As shown in FIG. 1A, two substantially arcuate protrusions 24, which protrude toward the rotation axis O1, are formed at equal angular intervals in the circumferential direction on the inner circumferential surface 23a of the recess 23.

As shown in FIG. 1B, the upper arm 20 and the lower arm 10 are fitted together so that the outer circumferential surface 20a of the upper arm 20 and the inner circumferential surface 11a of the lower arm 10 in contact with each other in a movable manner. When the inner circumferential surface 11a of the lower arm 10 and the outer circumferential surface 20a of the upper arm 20 are fitted together, a ring holder 29, which is formed from a metal plate, is arranged on the outer circumferences of the lower arm 10 and the upper arm 20. The holder 29 holds together the lower arm 10 and the upper arm 20 in the axial direction and retains the lower arm 10 and the upper arm 20 so that they can rotate relative to each other.

A lock mechanism 30 is arranged between the lower arm 10 and the upper arm 20. As shown in FIG. 2, the lock mechanism 30 mainly includes a pole 31A, which functions as a first pole, two poles 31B and 31C, which function as second poles, a cam 32, a release plate 33, a coil spring 34, which functions as a biasing member, and a pressing member 60.

Each of the poles 31A to 31C is arranged between the two adjacent guide walls 13 and 14. The three poles 31A to 31C are arranged at equal angular intervals on the circumference about the rotation axis O1.

The pole 31A is formed by, for example, forging steel. The pole 31A includes a first block 41 and a second block 42, which are formed at different levels. The first block 41 is arranged toward the inner circumferential surface 22a of the upper arm 20. The second block 42 is arranged toward the axis of the upper arm 20. Ends 311 and 312 of the first block 41 and the second block 42 in the width direction are formed to be aligned along parallel straight lines. Second teeth (external teeth) 44, which can be engaged with the internal teeth 22 of the upper arm 20, are formed on the arcuate outer end of the first block 41 (end surface facing the internal teeth 22 of the upper arm 20). An inner surface cam portion 45, which can be engaged with the outer circumference of the cam 32, is defined on the inner end of the first block 41 (back surface that is the end surface opposite to the outer end). The second block 42 includes a pole side groove cam portion 46 at a substantially middle position in the width direction. The pole side groove cam portion 46 extends through the second block 42 in the thickness direction.

The pole 31A is guided to move in the radial direction about the rotation axis O1 in a manner that the two width ends 311 and 312 of the pole 31A contact and move along the guide walls 13 and 14. As the pole 31A moves forward and backward in the radial direction along the guide walls 13 and 14, the external teeth 44 of the pole 31A are engaged with or disengaged from the internal teeth 22. The pole 31A includes an arcuate engagement unit 43 projecting in the axial direction toward the upper arm 20 and facing the recess 23 (inner circumferential surface 23a) in the radial direction. The engagement unit 43 forms a restricting member together with the protrusion 24.

Each of the poles 31B and 31C is formed by, for example, performing a pressing process on a steel plate. A part corresponding to the second block 42 of the pole 31A is cut from each of the poles 31B and 31C. Each of the poles 31B and 31C is in the form of a flat plate free from steps or in the form close to the shape of only the first block 41. More specifically, compared with the pole 31A, each of the poles 31B and 31C is shorter in the radial direction by the length of the second block 42, and thinner by the thickness of the second block 42. Like the pole 31A, ends 313 and 314 of the poles 31B and 31C in the width direction extend along parallel straight lines. External teeth 47, which can be engaged with the internal teeth 22 of the upper arm 20, are formed on the arcuate outer end of each of the poles 31B and 31C. An inner surface cam portion 48, which can be engaged with the outer circumference of the cam 32, is defined on the inner end of each of the poles 31B and 31C. Further, an engagement protrusion 49 is arranged on each of the poles 31B and 31C in the middle of the pole in the width direction. The engagement protrusion 49 protrudes toward the release plate 33.

The poles 31B and 31C are guided to move in the radial direction about the rotation axis O1, while the two width ends 313 and 314 of each of the poles 31B and 31C contact and move along the guide walls 13 and 14. As the poles 31B and 31C move forward and backward radially along the guide walls 13 and 14, the external teeth 47 of the poles 31B and 31C are engaged with or disengaged from the internal teeth 22.

The inner surface cam portion 45, which is formed on the step of the pole 31A, includes three pole side cam surfaces 50a, 50b, and 50c at the middle of the pole 31A in the circumferential direction and at the two ends of the pole 31A in the circumferential direction as shown in the enlarged view of FIG. 3A. The pole side cam surfaces 50a to 50c face the outer circumference parts (cam surfaces 55) of the cam 32. The pole side cam surfaces 50a to 50c each have an inclined surface that approaches the outer circumference part of the cam 32 as the cam 32 rotates in the locking direction (counterclockwise in FIGS. 3A and 3B).

As shown in the enlarged view of FIG. 3B, the inner surface cam portion 48 formed on the inner end of the pole 31B includes three pole side cam surfaces 51a, 51b, and 51c, which are shaped in conformance to the inner surface cam portion 45 of the pole 31A. As shown in FIG. 1A, the inner surface cam portion 48, which is formed on the inner end of the pole 31C, includes a pole side cam surface 52, which differs from the corresponding pole side cam surface 51c of the pole 31B. The pole side cam surface 52 defines a wedge-like void together with the guide wall 13 facing the surface in the circumferential direction. More specifically, the interval between the guide wall 13 and the pole side cam surface 52 narrows in the radially outward direction.

The cam 32 is arranged at the inner side of the three poles 31A to 31C, which are arranged in the recess 21 of the upper arm 20. The cam 32 is rotatable about the rotation axis O1.

The cam 32 is formed by, for example, performing a pressing process on a steel plate and is a flat plate free from steps. The cam 32 has three sets of cam surfaces 55, which are formed at equal angular intervals in the outer circumference. As shown in FIGS. 3A and 3B, three pressing cam portions 55a, 55b, and 55c are arranged in the middle of each cam surface 55 in the circumferential direction and at two ends of each cam surface 55 in the circumferential direction.

The two pressing cam portions 55a and 55b can come in contact with the two opposing pole side cam surfaces 50a and 50b of the pole 31A or the two opposing pole side cam surfaces 51a and 51b of the poles 31B and 31C. When the cam 32 rotates and reaches a lock position, the two pressing cam portions 55a and 55b press the corresponding pole side cam surfaces 50a, 50b, 51a, and 51b.

The remaining pressing cam portion 55c can come into contact with the remaining opposing pole side cam surfaces 50c and 51c of the poles 31A and 31B. When the cam 32 rotates and reaches the lock position, the pressing cam portion 55c presses the corresponding pole side cam surfaces 50c and 51c. Alternatively, the pressing cam portion 55c may accommodate a spherical pressing member 60 in the wedge-like void formed between the pole side cam surface 52 of the pole 31C and the guide wall 13. The pressing member 60 is arranged between the recess 11 of the lower arm 10 and the peripheral end of the release plate 33 in the axial direction. The pressing member 60 moves in the radial direction while it is in contact in a movable manner with the pole side cam surface 52 and the guide wall 13. The pressing cam portion 55c can come in contact with the pressing member 60 and presses the pressing member 60 when the cam 32 rotates and reaches the lock position.

When the cam 32 rotates and reaches the lock position, the three pressing cam portions 55a to 55c are held at angular positions where they can come in contact with the three pole side cam surfaces 50a to 50c of the pole 31A, the three pole side cam surfaces 51a to 51c of the pole 31B, the two pole side cam surfaces 51a and 51b of the pole 31C, and the pressing member 60.

The pressing member 60 is pressed by the cam 32, and comes in contact under pressure with the guide wall 13 and the pole side cam surface 52. The pressing member 60 applies a pressing force that is divided into a partial force including components in the direction in which the pole 31C moves (components in the radial direction) and a partial force including components in the width direction of the pole 31 (components in the circumferential direction), which is a direction orthogonal to the direction of the movement. The wedging effect produced by the width components of the partial force of the pole causes the width end 313 of the pole 31C and the guide wall 13 to be spaced from each other in the circumferential direction and fill the gap between the width end 313 of the pole 31C and the guide wall 14.

As shown in FIGS. 3A and 3B, as the cam 32 rotates in the unlocking direction, the two pressing cam portions 55a and 55b are spaced from the two pole side cam surfaces 50a and 50b of the pole 31A or the two pole side cam surfaces 51a and 51b of the poles 31B and 31C. Further, the pressing cam portion 55c is spaced from the pole side cam surfaces 50c and 51c of the poles 31A and 31B or from the pressing member 60.

More specifically, the cam 32 rotates in the locking direction (counterclockwise in FIGS. 3A and 3B) to cause the poles 31A, 31B, and 31C to be pressed in the radially outward direction of the lower arm 10 and move to a lock position where the external teeth 44 of each of the poles 31A, 31B, and 31C are engaged with the internal teeth 22. The cam 32 rotates in the unlocking direction to cause the poles 31A, 31B, and 31C to move in the radially inward direction of the lower arm 10 and move to an unlock position where the external teeth 44 of each of the poles 31A, 31B, and 31C are disengaged from the internal teeth 22.

As shown in FIG. 1A, a plurality of engagement protrusions 57 are arranged on the side surface of the cam 32. The engagement protrusions 57 are spaced from each other in the circumferential direction. One of the engagement protrusions 57 is fit in and engaged with the pole side groove cam portion 46 of the pole 31A. The pole side groove cam portion 46 and the engagement protrusion 57 cause the pole 31A to move in the radially inward direction when the cam 32 rotates in the unlocking direction. More specifically, as shown in FIG. 3A, the pole side groove cam portion 46 is basically shaped to move gradually in the radially outward direction as the cam 32 moves in the unlocking direction (clockwise direction as viewed in the drawing). As the cam 32 rotates in the unlocking direction, the pole 31A, in which the pole side groove cam portion 46 is pressed against the engagement protrusion 57, is pulled in the radially inward direction.

As shown in FIG. 2, the thin release plate 33 is engaged with the engagement protrusions 57. Thus, the thin release plate 33 is integrally attached to the side surface of the cam 32. A through-hole 33a extends through the center of the release plate 33. The release plate 33 is attached to the cam 32 in correspondence with the second block 42 of the pole 31A in the axial direction. The release plate 33 is arranged to face and contact in a movable manner along the end surface of the pole 31B. In this case, the two poles 31B and 31C and the release plate 33 are accommodated within the range of the thickness of the pole 31A. The release plate 33 is formed from a substantially annular plate, which is not in contact with the protrusions 24 formed on the upper arm 20. The annular plate forming the release plate 33 has a sectoral cutoff 33b, which accommodates the pole 31A. More specifically, the annular plate pole 31A is partially cut off to remove a sectoral part of an angular range corresponding to the pole 31A. This prevents the release plate 33 from interfering with the pole 31A when the cam 32 rotates.

The release plate 33 includes two release plate side groove cam portions 59 along a circumference extending about the rotation axis of the release plate 33. The release plate side groove cam portions 59 extend through the release plate 33 in the thickness direction. The two release plate side groove cam portions 59 are arranged outwardly in the radial direction from the circumferential positions of the engagement protrusions 57 in correspondence with the end surfaces of the poles 31B and 31C. The engagement protrusions 49 arranged on the corresponding poles 31B and 31C are fit in and engaged with the release plate side groove cam portions 59. Each release plate side groove cam portion 59 is engaged with the corresponding engagement protrusion 49. This structure causes the poles 31B and 31C to move in the radially inward direction as the release plate 33 rotates in the unlocking direction integrally with the cam 32. More specifically, as shown in FIG. 3B, each release plate side groove cam portion 59 is shaped so that it basically moves gradually in the radially outward direction as the cam 32 rotates in the unlocking direction (clockwise direction as viewed in the drawing). This structure causes the poles 31B and 31C, in which the engagement protrusions 49 are pressed against the release plate side groove cam portions 59, to be pulled in the radially inward direction as the release plate 33 rotates in the unlocking direction integrally with the cam 32.

The coil spring 34 rotates and biases the cam 32 in the direction in which the three poles 31A to 31C are engaged with the upper arm 20. As shown in FIG. 2, the coil spring 34 is accommodated in the through-hole 16 of the lower arm 10. The coil spring 34, which is formed by, for example, bending a substantially rectangular flat wire into a predetermined spiral, is arranged between the lower arm 10 and the cam 32. More specifically, the coil spring 34 has an external distal end 34a engaged with the engagement hole 16a, and an internal distal end 34b engaged with an engagement part (not shown) formed on the end surface of the cam 32.

The biasing force of the coil spring 34 biases and rotates the cam 32 in the locking direction (counterclockwise in FIG. 1A) against the lower arm 10. The cam surfaces 55 of the cam 32 press the poles 31A to 31C in the radially outward direction and engages the external teeth 44 and 47 of the poles 31A to 31C with the internal teeth 22 of the upper arm 20.

Figure 3:
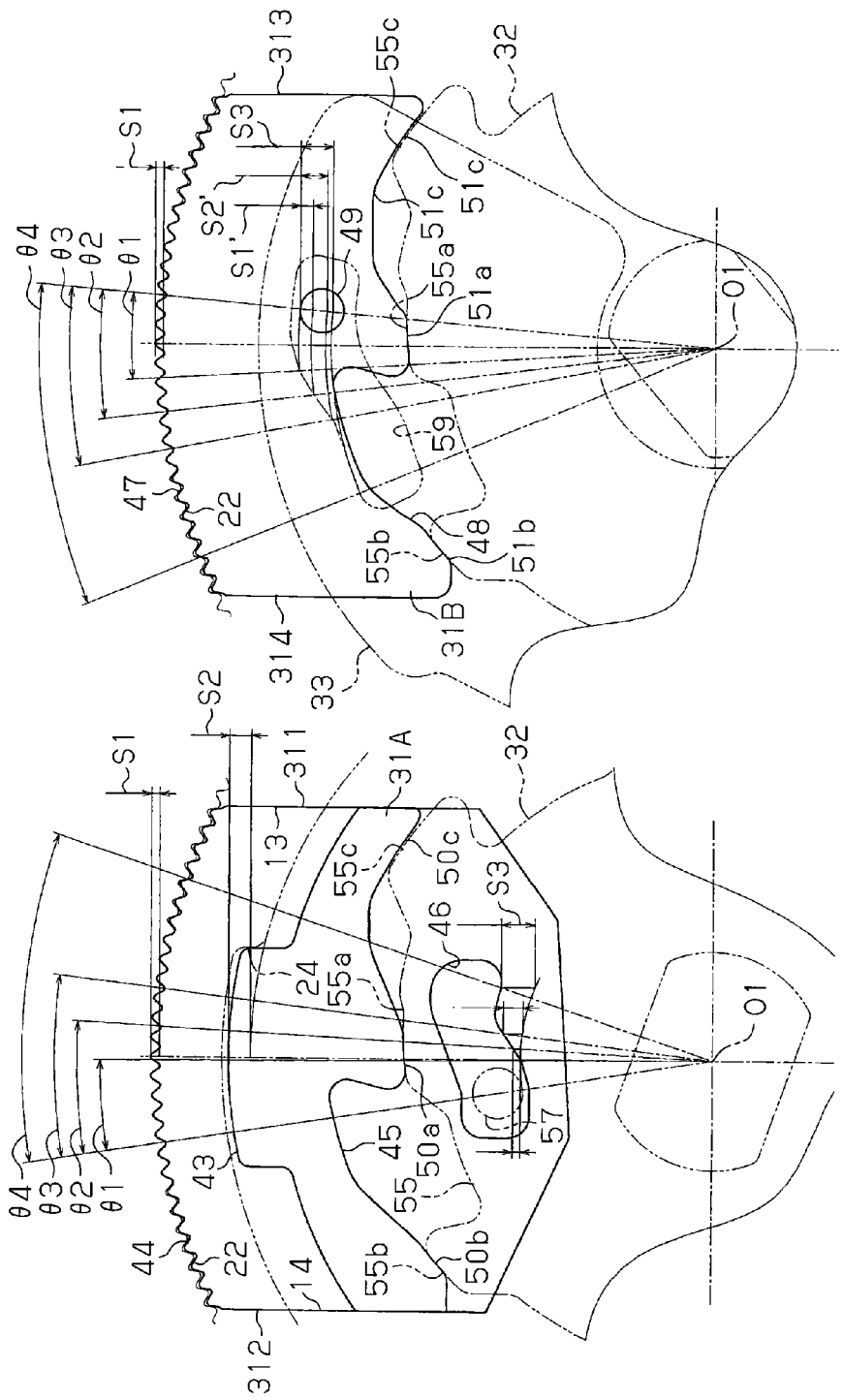
FIGS. 3A and 3B are enlarged views of the engagement structure between a pole and a cam.

The relationship between the rotation angle θ of the cam 32, which serves as the origin when the external teeth 44 and 47 of the poles 31A and 31B are engaged with the internal teeth 22 of the upper arm 20 due to the biasing force of the coil spring 34, and the sliding amounts S and S', which are the amounts of movement of the poles 31A and 31B in the radial direction in which the poles 31A and 31B are spaced from the internal teeth 22, will now be described with reference to FIG. 3A to FIG. 4. The pole 31C is basically the same as the pole 31B, and will not be described.

As shown in FIG. 3A, the sliding amount S of the pole 31A for when the external teeth 44 of the pole 31A are disengaged from the internal teeth 22 is referred to as the sliding amount S1. The sliding amount S for when the engagement unit 43 of the pole 31A is allowed to move onto the protrusion 24 is referred to as the sliding amount S2. During the unlocking operation performed when the cam 32 rotates in the unlocking direction, the rotation angle θ for when the engagement protrusion 57 comes in contact with the pole side groove cam portion 46 after moving freely is referred to as the rotation angle θ1. The rotation angle θ corresponding to where the sliding amount S of the pole 31A reaches the sliding amount S1 is referred to as the rotation angle θ2. The rotation angle θ corresponding to where the sliding amount S of the pole 31A reaches the sliding amount S2 is referred to as the rotation angle θ3. In addition, the sliding amount S corresponding to when the engagement protrusion 57 reaches the distal end of the pole side groove cam portion 46 and the external teeth 44 of the pole 31A are farthest from the internal teeth 22 as the cam 32 rotates in the unlocking direction is referred to as the sliding amount S3. The rotation angle θ of the cam 32 under this situation is referred to as the rotation angle θ4.

As shown in FIG. 3B, during the unlocking operation performed when the cam 32 rotates in the unlocking direction, the sliding amount S' corresponding to where the external teeth 44 of the pole 31A are disengaged from the internal teeth 22 is referred to as the sliding amount S1'. In addition, the sliding amount S' corresponding to where the engagement unit 43 of the pole 31A reaches the position where the engagement unit is allowed to move over the protrusion 24 is referred to as the sliding amount S2'. The sliding amount S' corresponding to where the external teeth 47 of the pole 31B are farthest from the internal teeth 22 is set to be equal to the sliding amount S3.

The cam 32 at the origin starts rotating in the unlocking direction. As indicated by solid lines in FIG. 4, when the rotation angle θ of the cam 32 reaches the rotation angle θ1, the pole side groove cam portion 46 starts being pulled with the engagement protrusion 57 in the radially inward direction, and the sliding amount S of the pole 31A starts increasing. Subsequently, when the rotation angle θ of the cam 32 reaches the rotation angle θ2, the sliding amount S of the pole 31A reaches the sliding amount S1. This disengages the external teeth 44 of the pole 31A from the internal teeth 22. Subsequently, when the rotation angle θ of the cam 32 reaches the rotation angle θ3, the sliding amount S of the pole 31A reaches the sliding amount S2 and allows the engagement unit 43 of the pole 31A to move over the protrusion 24. Subsequently, when the rotation angle θ of the cam 32 reaches the rotation angle θ4, the engagement protrusion 57 reaches the distal end of the pole side groove cam portion 46, and the sliding amount S reaches the sliding amount S3, at which the pole 31A is farthest from the internal teeth 22.

Figure 4:
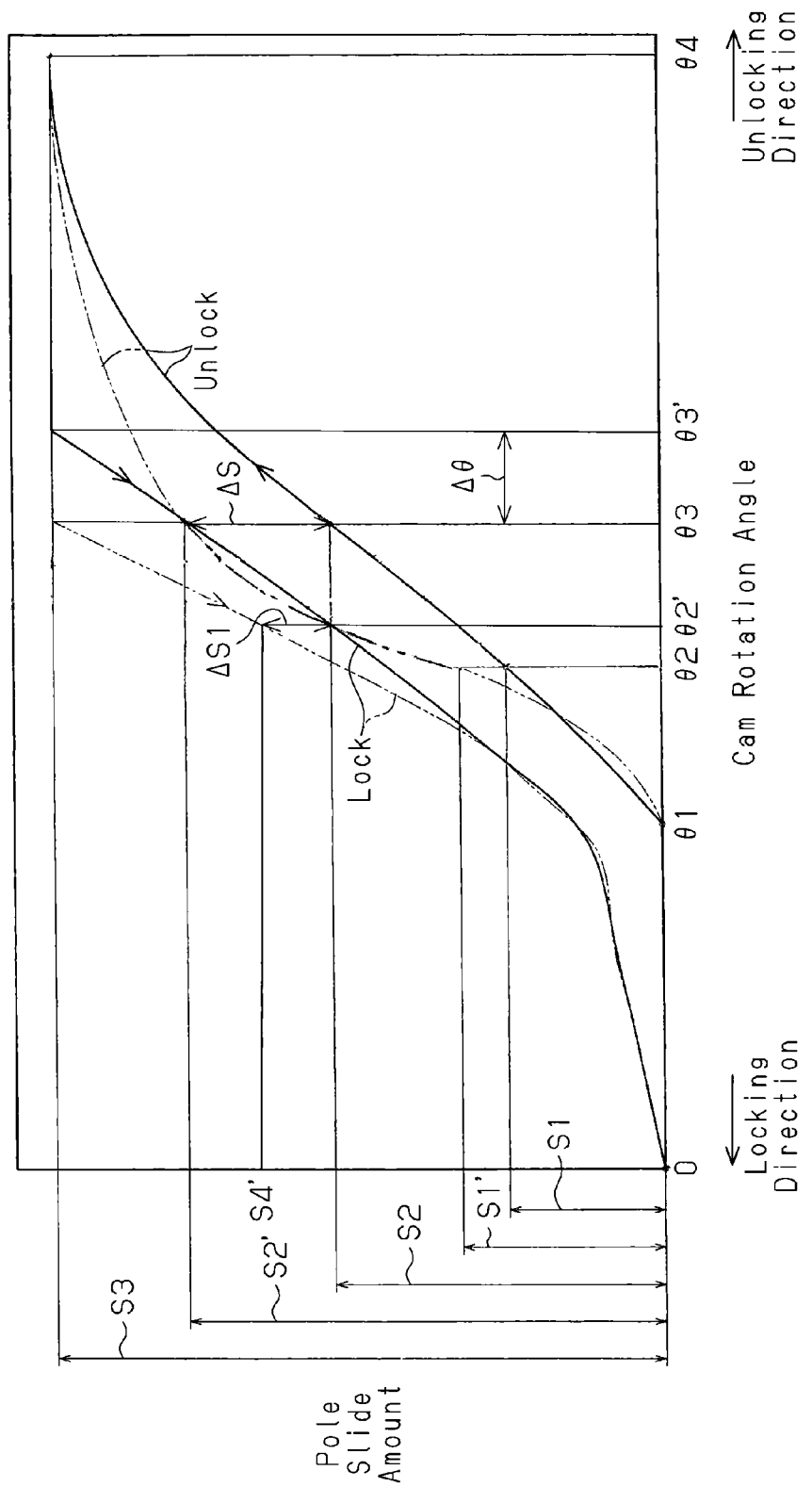
FIG. 4 is a graph showing the relationship between the rotation angle of the cam and the amount of sliding of the pole.

As indicated by the double-dashed line in FIG. 4, when the rotation angle θ of the cam 32 reaches the rotation angle θ1 as the cam 32 rotates in the unlocking direction, the release plate side groove cam portion 59 of the release plate 33 that rotates integrally with the cam 32 starts pulling the engagement protrusion 49 in the radially inward direction, and the sliding amount S' of the pole 31B starts increasing. In the present embodiment, the sliding amount S' of the pole 31B increases to the sliding amount S1' in a manner that the sliding amount S1' first increases at a higher rate than the sliding amount S. The sliding amount S1' of the pole 31B is larger than the sliding amount S1 of the pole 31A when the rotation angle θ of the cam 32 reaches the rotation angle θ2. More specifically, when the external teeth 44 of the pole 31A and the internal teeth 22 are disengaged from each other, the disengagement of the external teeth 47 of the pole 31B from the internal teeth 22 is ensured.

Subsequently, when the rotation angle θ of the cam 32 reaches the rotation angle θ3, the release plate side groove cam portion 59 of the release plate 33, which rotates integrally with the cam 32, pulls the engagement protrusion 49 further in the radially inward direction. This causes the sliding amount S' of the pole 31B to reach the sliding amount S2'. In the present embodiment, the sliding amount S of the pole 31A increases substantially at a higher rate than the sliding amount S' of the pole 31B when the rotation angle θ of the cam 32 increases from the rotation angle θ2 to the rotation angle θ3. This increases the degree by which the sliding amount S' of the pole 31B is larger than the sliding amount S of the pole 31A. This further increases the degree by which the sliding amount S2' of the pole 31B is larger than the sliding amount S2 of the pole 31A. The deviation between the sliding amounts S and S' (the degree by which the sliding amount S2' is larger than the sliding amount S2) is expressed as ΔS (=S2'−S2). When the engagement unit 43 of the pole 31A is allowed to move over the protrusion 24, it is ensured that the tips of the external teeth 47 of the pole 31B do not interfere with the tips of the internal teeth 22.

Subsequently, when the rotation angle θ of the cam 32 reaches the rotation angle θ4, the release plate side groove cam portion 59 of the release plate 33, of which rotation is restricted by the restricted rotation of the cam 32, due to the engagement protrusion 57 reaching the distal end of the pole side groove cam portion 46, restricts radial movement of the pole 31B. Here, the sliding amount S' of the pole 31B is equal to the sliding amount S3. In the present embodiment, the sliding amount S of the pole 31A substantially increases at a smaller rate than the sliding amount S' of the pole 31B when the rotation angle θ of the cam 32 increases from the rotation angle θ3 to the rotation angle θ4. To equalize the sliding amounts S and S' at the rotation angle θ4, the degree by which the sliding amount S' of the pole 31B is larger than the sliding amount S of the pole 31A gradually decreases.

The cam 32 arranged at the rotation angle θ4 starts the locking operation when the cam 32 rotates in the locking direction. As indicated by the solid line in FIG. 4, when the rotation angle θ of the cam 32 reaches a predetermined rotation angle θ3' between the angles of rotation θ4 and θ3, the cam surface 55 of the cam 32 starts pressing the inner surface cam portion 45 of the pole 31A in the radially outward direction. This decreases the sliding amount S of the pole 31A in a substantially proportional manner. When the rotation angle θ of the cam 32 reaches a predetermined rotation angle θ2' between the angles of rotation θ3 and θ2, the sliding amount S of the pole 31A reaches the sliding amount S2 (corresponding to where the engagement unit 43 of the pole 31A is allowed to move over the protrusion 24). In the present embodiment, the rotation angle θ2' corresponding this timing is set equal to the rotation angle (θ2') at which the sliding amount S' of the pole 31B reaches the sliding amount S2 as the cam 32 rotates in the unlocking direction. The rotation angle at which the sliding amount S' of the pole 31B reaches the sliding amount S2 only needs to be larger than the rotation angle θ2' at which the sliding amount S of the pole 31B' reaches the sliding amount S2 as the cam 32 rotates in the unlocking direction. Subsequently, when the rotation angle θ of the cam 32 reaches the proximity of the rotation angle θ1, the sliding amount S of the pole 31A decreases at a lower rate. When the rotation angle θ of the cam 32 reaches the origin, the external teeth 44 are engaged with the internal teeth 22. This causes the sliding amount S of the pole 31A to be zero.

As indicated by the double-dashed line in FIG. 4, the cam 32 starts the locking operation when the cam 32 rotates in the locking direction, and the rotation angle θ of the cam 32 reaches the rotation angle θ3. At this timing, the cam surface 55 of the cam 32 starts pressing the inner surface cam portion 48 of the pole 31B in the radially outward direction. This causes the sliding amount S' of the pole 31B to start decreasing in a substantially proportional manner. To delay the operations of the poles 31B and 31C against the operation of the pole 31A during the locking operation, the angular difference Δθ (=θ3'−θ3) is set between the rotation angle θ3' of the cam 32 corresponding to when the cam 32 starts pressing the pole 31A, and the rotation angle θ3 of the cam 32 corresponding to when the cam 32 starts pressing the poles 31B and 31C. In the present embodiment, the sliding amount S' of the pole 31B is decreased by a higher rate than the sliding amount S of the pole 31A (with a larger gradient). This causes the sliding amount S of the pole 31B' to start decreasing at a later timing than the sliding amount S of the pole 31A, although the degree by which the sliding amount S' is larger than the sliding amount S gradually decreases.

When the timing at which the cam surface 55 of the cam 32 starts pressing the inner surface cam portion 48 of the pole 31B is later than the timing at which the cam surface 55 of the cam 32 starts pressing the inner surface cam portion 45 of the pole 31A, that is, when the rotation angle θ of the cam 32 corresponding to this timing is smaller than the rotation angle θ3', the timing may correspond to the rotation angle θ3.

Subsequently, when the rotation angle θ of the cam 32 reaches the rotation angle θ2', the sliding amount S of the pole 31B' decreases to the sliding amount S4'. The sliding amount S' of the pole 31B is larger than the sliding amount S of the pole 31A, although the degree by which the sliding amount S' of the pole 31B is larger than the sliding amount S of the pole 31A is smaller as compared with the degree at the beginning of the locking operation. More specifically, when the engagement unit 43 of the pole 31A moves onto the protrusion 24, the distance by which the pole 31B is spaced from the internal teeth 22 in the radial direction is set to be larger than the distance by which the pole 31A is spaced from the internal teeth 22 in the radial direction. The deviation between the sliding amounts S and S' (the degree by which the sliding amount S' is larger than the sliding amount S) is expressed as ΔS1 (=S4'−S2). More specifically, before at least the sliding amount S of the pole 31A reaches the sliding amount S2 with which the engagement unit 43 of the pole 31A moves over the protrusion 24, the sliding amount S' starts decreasing at a later timing than the sliding amount S. This setting ensures that the tips of the external teeth 47 of the pole 31B do not interfere with the tips of the internal teeth 22 when the engagement unit 43 of the pole 31A moves over the protrusion 24.

The sliding amounts S and S' become equal to each other when the rotation angle θ of the cam 32 reaches the vicinity of the rotation angle at which the external teeth 47 of the pole 31B and the internal teeth 22 are engaged with each other. This allows the external teeth 44 and 47 of the two poles 31A and 31B to be engaged with the internal teeth 22 at substantially the same time so that the external teeth 44 and 47 of any of the poles 31A and 31B from being engaged with teeth at positions different from the intended corresponding internal teeth.

Subsequently, the sliding amount S' of the pole 31B decreases at a lower rate in the same manner as the pole 31A. When the rotation angle θ of the cam 32 reaches the origin, the external teeth 47 are engaged with the internal teeth 22. This causes the sliding amount S of the pole 31B' to be zero.

The differing profiles of the sliding amounts S and S' during rotation of the cam 32 in the locking direction are due to the shapes of the two inner surface cam portions 45 and 48, which are engaged with the cam surfaces 55 of the cam 32.

Figure 5:
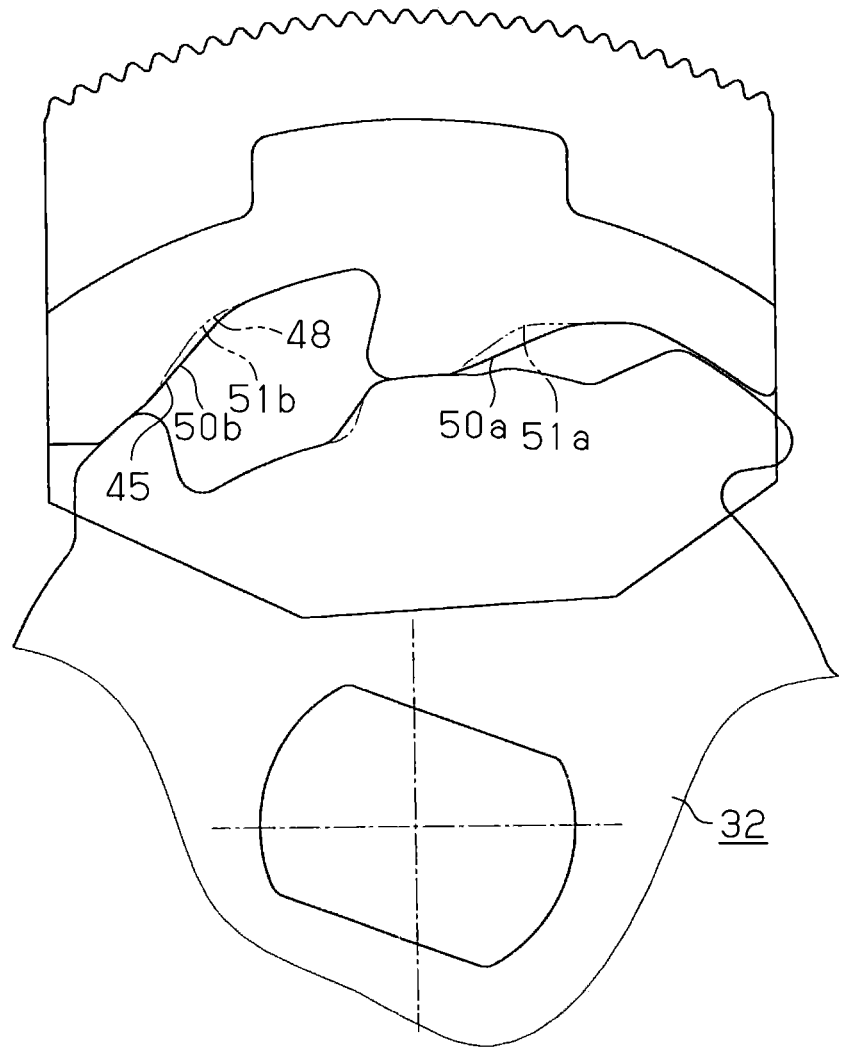
FIG. 5 is an enlarged view of the engagement structure between the pole and the cam.

More specifically, as the inner surface cam portion 45 of the pole 31A is indicated by a solid line in FIG. 5 and the inner surface cam portion 48 of the pole 31B is indicated by a double-dashed line overlapped with the solid line in the drawing, the four pole side cam surfaces 50a, 50b, 51a, and 51b are shaped so that the two pole side cam surfaces 51a and 51b of the inner surface cam portion 48 are partially arranged more outwardly in the radial direction from the two pole side cam surfaces 50a and 50b of the inner surface cam portion 45. This structure delays the timing at which the two pressing cam portions 55a and 55b (cam surfaces 55) are pressed against the two pole side cam surfaces 51a and 51b (inner surface cam portion 48), which correlates with the sliding amount S of the pole 31B', relative to the timing at which the two pressing cam portions 55a and 55b (cam surfaces 55) are pressed against the two pole side cam surfaces 50a and 50b (inner surface cam portion 45), which correlates with the sliding amount S of the pole 31A.

The operation of the present embodiment will now be described.

As shown in FIG. 1A, when the vehicle seat reclining device 1 is locked, the coil spring 34 rotates and biases the cam 32 in the counterclockwise direction as viewed in the drawing so that the cam 32 (three pressing cam portions 55a to 55c) come into contact with the three pole side cam surfaces 50a to 50c of the poles 31A, the three pole side cam surfaces 51a to 51c of the pole 31B, the two pole side cam surfaces 51a and 51b of the pole 31C, and the pressing member 60. In this state, the poles 31A to 31C are pressed in the radially outward direction. This causes the external teeth 44 and 47 of the poles 31A to 31C and the internal teeth 22 of the upper arm 20 to be engaged with each other, restricts rotation of the upper arm 20 relative to the lower arm 10, and restricts (locks) rotation of the seat back 132 relative to the seat cushion 131.

When the operation handle is operated in this state to integrally rotate the cam 32 and the release plate 33 against the biasing force applied from the coil spring 34, the cam 32 (three pressing cam portions 55a to 55c) is spaced from the three pole side cam surfaces 50a to 50c of the pole 31A, the three pole side cam surfaces 51a to 51c of the pole 31B, and the two pole side cam surfaces 51a and 51b of the pole 31C, and the pressing member 60. With the pole side groove cam portion 46 of the pole 31A being engaged with the engagement protrusion 57 of the cam 32, the pole 31A is pulled toward the rotation axis O1 along the two guide walls 13 and 14. This disengages the engagement between the external teeth 44 of the pole 31A and the internal teeth 22. At the same time, when the engagement protrusion 49 of the poles 31B and 31C and the release plate side groove cam portion 59 are engaged with each other, the poles 31B and 31C are pulled toward the rotation axis O1 along the guide walls 13 and 14. This disengages the external teeth 47 of the poles 31B and 31C from the internal teeth 22.

With the external teeth 44 and 47 of the poles 31A to 31C disengaged from the internal teeth 22, rotation of the upper arm 20 relative to the lower arm 10 is permitted. This permits (unlocks) rotation of the seat back 132 relative to the seat cushion 131. In this state, the seat back 132 can be rotated to any angular position relative to the seat cushion 131.

When the seat back 132 in the unlocked state is rotated relative to the seat cushion 131 in the forward direction by a predetermined angle or greater, that is, when the seat back 132 is rotated in a forward folding angular range, the protrusion 24 formed on the inner circumferential surface 23a of the recess 23 of the upper arm 20 is located between the engagement unit 43 formed on the pole 31A and the internal teeth 22. More specifically, the engagement unit 43 of the pole 31A is engaged with the protrusion 24 of the upper arm 20 to restrict movement of the pole 31A in the radially outward direction. When the force applied to the operation handle is released in this state, the movement of the pole 31A is restricted by the engaged structure of the protrusion 24 of the upper arm 20 and the engagement unit 43 of the pole 31A. Thus, the pole 31A is not engaged with the internal teeth 22, although the cam 32, biased by the coil spring 34, presses the pole 31A in the direction in which the pole 31A can be engaged with the internal teeth 22. At the same time, restriction of the radial movement of the pole 31A restricts the rotation of the cam 32. Thus, the release plate 33 does not rotate. As a result, the release plate side groove cam portion 59 retains the poles 31B and 31C at positions separated from the internal teeth 22, where the poles and the internal teeth are disengaged from each other. Within the forward folding angular range, the seat back 132 is not locked and freely rotatable.

In the present embodiment, the cam 32 rotates in both the unlocking direction and the locking direction so that the sliding amounts S' (S2' and S4') of the corresponding poles 31B and 31C are larger than the sliding amount S of the pole 31A (S2), corresponding to where the engagement unit 43 of the pole 31A can be engaged with the protrusion 24 of the upper arm 20. This ensures that the tips of the external teeth 47 of the poles 31B and 31C and the tips of the internal teeth 22 do not interfering with each other.

The operation handle is operated in the forward folded state to move the seat back 132 to a position optimum for seating. When the operation force applied to the operation handle is released in this state, the three poles 31A to 31C, the cam 32, and the release plate 33 return to the state shown in FIG. 1A corresponding to the locked state.

As described in detail above, the present embodiment has the advantages described below.

(1) In the present embodiment, when the pole 31A reaches a position corresponding to an engagement prohibition state the external teeth 44 and the internal teeth 22 due to the protrusion 24 and the like during the unlocking operation, the amount of radial movement (S2') of each of the poles 31B and 31C away from the internal teeth 22 is set to be larger than the amount of radial movement (S2) of the pole 31A away from the internal teeth 22. If, for example, the two poles 31B and 31C deviate in the radial direction toward the internal teeth 22 due to manufacturing variations or assembling variations, the difference between the movement amounts can accommodate such deviation. This reduces interference between the tips of the external teeth 47 of the pole 31B and 31C and the tips of the internal teeth 22, and allows smooth operations.

(2) In the present embodiment, when the pole 31A is in the engagement prohibition state of the external teeth 44 of the pole 31A and the internal teeth 22 due to the protrusion 24 and the like during the locking operation, the movement amount (S4') of each of the poles 31B and 31C away from the internal teeth 22 in the radial direction is set to be larger than the movement amount (S2) of the pole 31A away from the internal teeth 22 in the radial direction. This further ensures that the two poles 31B and 31C, of which movement in the radially outward direction (toward the internal teeth 22) is restricted indirectly by the cam 32 and the release plate 3, are not positioned more outwardly in the radial direction than the pole 31A. When, for example, the seat back 132 is tilted in this state, interference between the external teeth 47 of the poles 31B and 31C and the internal teeth 22 may be suppressed.

(3) In the present embodiment, the angle difference Δθ is set between the rotation angle (θ3') of the cam 32 at which the pole 31A starts being pressed and the rotation angle (θ3) of the cam 32 at which the poles 31B and 31C start being pressed during the locking operation to delay the operation of each of the poles 31B and 31C from the operation of the pole 31A. In this case, the amount of movement of the pole 31A and the amount of movement of each of the two poles 31B and 31C during the locking operation may be set to change proportionally relative to the rotation angle of the cam 32 after the pole 31A and the poles 31B and 31C start being pressed. Even under this setting, the poles 31B and 31C are prevented from being positioned more outwardly than the pole 31A in the radial direction when the pole 31A is in the engagement prohibition state of the external teeth 44 and the internal teeth 22 due to the protrusion 24 and the like. Thus, simple engagement between the pole 31A and each of the poles 31B and 31C with the cam 32 can reduce interference between the external teeth 47 of each of the poles 31B and 31C and the internal teeth 22 during the locking operation when the pole 31A is in the engagement prohibition state of the external teeth 44 and the internal teeth due to the protrusion 24 and the like.

(4) In the present embodiment, the rotation angle (θ2') of the cam 32 in the engagement prohibition state of the external teeth 44 of the pole 31A and the internal teeth 22 caused by the protrusion 24 and the like during the locking operation is equal to the rotation angle (θ2') of the cam 32 at which the pole 31A reaches the position corresponding to the engagement prohibition state of the external teeth 44 of the poles 31B and 31C and the internal teeth 22 caused by the protrusion 24 and the like during the unlocking operation. When the pole 31A is in the engagement prohibition state of the external teeth 44 of the pole 31A and the internal teeth 22 caused by the protrusion 24 and the like during the locking operation, even if movement of each of the poles 31B and 31C occurs toward the internal teeth 22 in the radial direction, each of the poles 31B and 31C are restricted from being positioned over the position of the pole 31A (sliding amount S2) corresponding to the engagement prohibition state of the external teeth 44 and the internal teeth 22. Thus, during the locking operation, when the pole 31A is in the engagement prohibition state of the external teeth 44 and the internal teeth 22 due to the protrusion 24 and the like, reduction in the interference between the external teeth 47 of the poles 31B and 31C and the internal teeth 22 is further ensured.

(5) In the present embodiment, the rotation angle of the cam 32 corresponding to the radial movement amounts of the pole 31A and the two poles 31B and 31C away from the internal teeth 22 during the locking operation may converge and become equal when the external teeth 44 and 47 of the pole 31A and the two poles 31B and 31C are engaged with the internal teeth 22. This allows for the external teeth 44 and 47 of the three poles 31A to 31C to be engaged with the internal teeth 22 at the same time, and suppresses engagement of the poles 31A to 31C with teeth at different positions from the intended corresponding internal teeth 22.

(6) In the present embodiment, the amount of radial movement (S') of the poles 31B and 31C away from the internal teeth 22 during the unlocking operation is set to be larger than the amount of radial movement (S) of the pole 31A away from the internal teeth 22 within the range from the position where at least the external teeth 44 of the pole 31A are disengaged from the internal teeth 22 to the position corresponding to the engagement prohibition state of the external teeth 44 and the internal teeth 22 caused by the protrusion 24 and the like (angles of rotation θ2 to θ3). In the engagement prohibition state of the external teeth 44 of the pole 31A and the internal teeth 22 due to the protrusion 24 and the like during the locking operation, the poles 31B and 31C, of which movement in the radially outward direction (toward the internal teeth 22) is restricted indirectly by the cam 32 and the release plate 33, may move toward the internal teeth 22 in the locking direction within the range of play. In this case, the difference between the movement amounts can accommodate such movement and reduce interference between the tips of the external teeth 47 of the poles 31B and 31C and the tips of the internal teeth 22.

(7) In the present embodiment, the engagement between the external teeth 47 of the poles 31B and 31C and the internal teeth 22 is disengaged when the release plate side groove cam portions 59 pull the engagement protrusions 49 as the release plate 33 rotates integrally with the cam 32 in the unlocking direction. The engagement between the poles 31B and 31C is disengaged by the release plate 33 to simplify the engagement structure of the poles 31B and 31C and the cam 32.

Second Embodiment

A vehicle seat reclining device according to a second embodiment of the present invention will now be described with reference to FIGS. 6A to 8. The second embodiment differs from the first embodiment mainly in the engagement structure of the poles and the cam. The components of the second embodiment that are the same as the first embodiment are given the same reference numerals and may not be described.

Figure 6B:
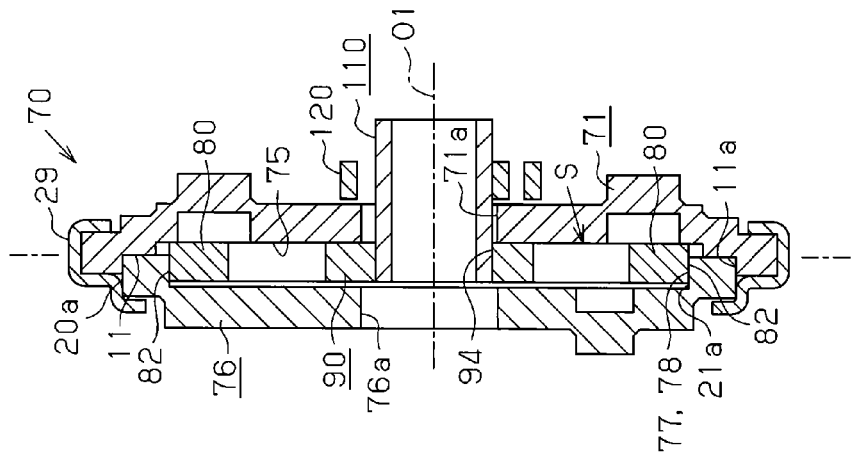
FIGS. 6A and 6B are a horizontal cross-sectional view and a vertical cross-sectional view illustrating a second embodiment of the present invention.
Figure 6A:
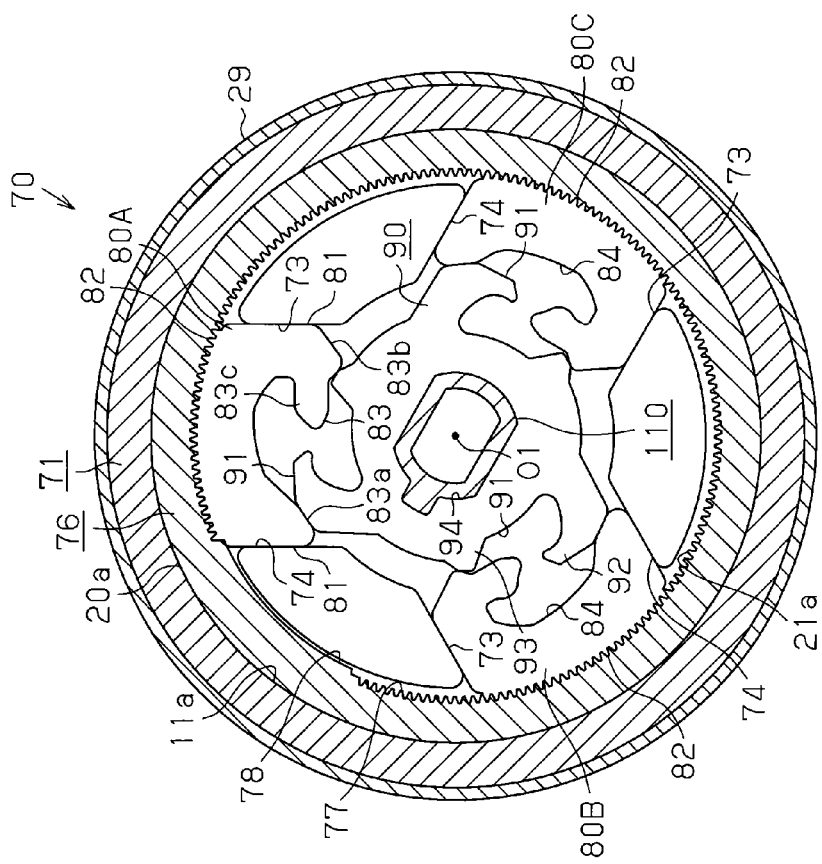

As shown in FIGS. 6A and 6B, the vehicle seat reclining device 70 of the present embodiment includes a disk-shaped lower arm 71, which functions as a first arm, and a disk-shaped upper arm 76, which functions as a second arm. Circular through-holes 71a and 76a, which have substantially the same inner diameters, extend through the central portions of the lower arm 71 and the upper arm 76 along the rotation axis O1.

Figure 7:
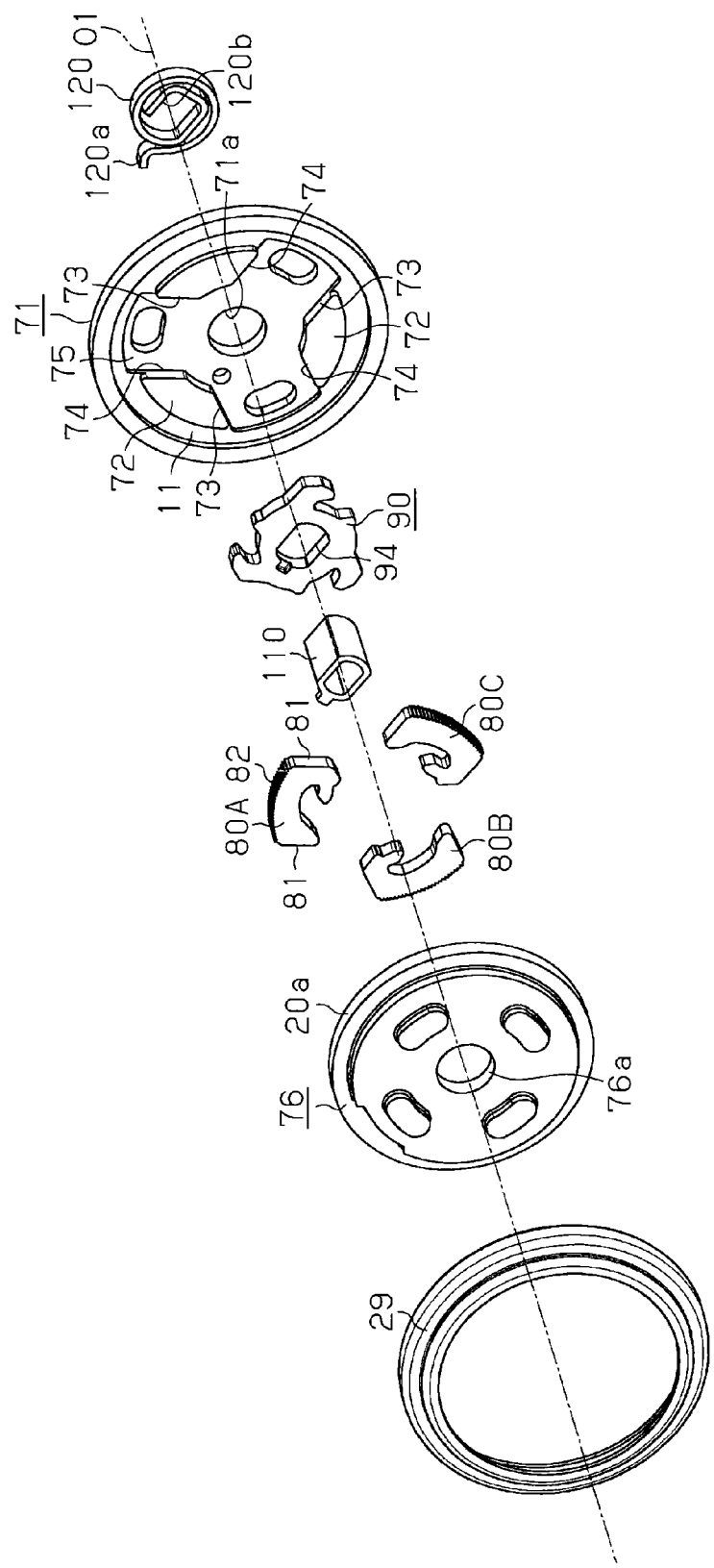
FIG. 7 is an exploded perspective view of the second embodiment of the present invention.

As shown in FIG. 7, the recess 11 of the lower arm 71 includes three substantially sectoral protrusions 72 arranged at equal angular intervals in the circumferential direction. Each protrusion 72 has two guide walls 73 and 74 in the circumferential direction. The two opposing guide walls 73 and 74 of the adjacent protrusions 72 in the circumferential direction extend parallel with each other in the radial direction about the rotation axis O1. Together with the bottom surfaces of the recesses 11, the guide walls define substantially U-shaped guide grooves 75, which are arranged at equal angular intervals in the circumferential direction and extend in the radial direction about the rotation axis O1. The guide grooves 75 communicate with one another at the central portion in a substantially Y-shaped manner as a whole.

As shown in FIG. 6A, an inner circumferential surface 21a of the upper arm 76 includes an internal teeth portion 77 and an arcuate toothless portion 78 in the circumferential direction. The internal teeth portion 77 includes internal teeth 22. The toothless portion 78 functions as a restriction unit that protrudes toward the inner side from a circle extending along by the tips of the internal teeth 22.

A pole 80A, which functions as a first pole, two poles 80B and 80C, which function as second poles, and a cam 90 are accommodated between the lower arm 71 and the upper arm 76. The three poles 80A to 80C are arranged at equal angular intervals on a circumference in the plane orthogonal to the rotation axis O1.

More specifically, the poles 80A to 80C are formed by, for example, pressing a steel plate, and are substantially gate-like flat plates that are basically free from steps. The poles 80A to 80C are formed so their ends 81 in the width direction extend along parallel straight lines. The poles 80A to 80C are mounted in a freely movable manner in the radial direction along the guide grooves 75 as the corresponding two width ends 81 contact and move along the guide walls 73 and 74 of the guide grooves 75.

Each of the poles 80A to 80C has external teeth 82, which can be engaged with the internal teeth 22, at its arcuate outer end (end surface facing the internal teeth 22 and other elements of the upper arm 76). Each of the poles 80A to 80C moves forward and backward in the radial direction along the guide walls 73 and 74 so that its external teeth 82 are engaged with or disengaged from the internal teeth 22.

Figure 8:
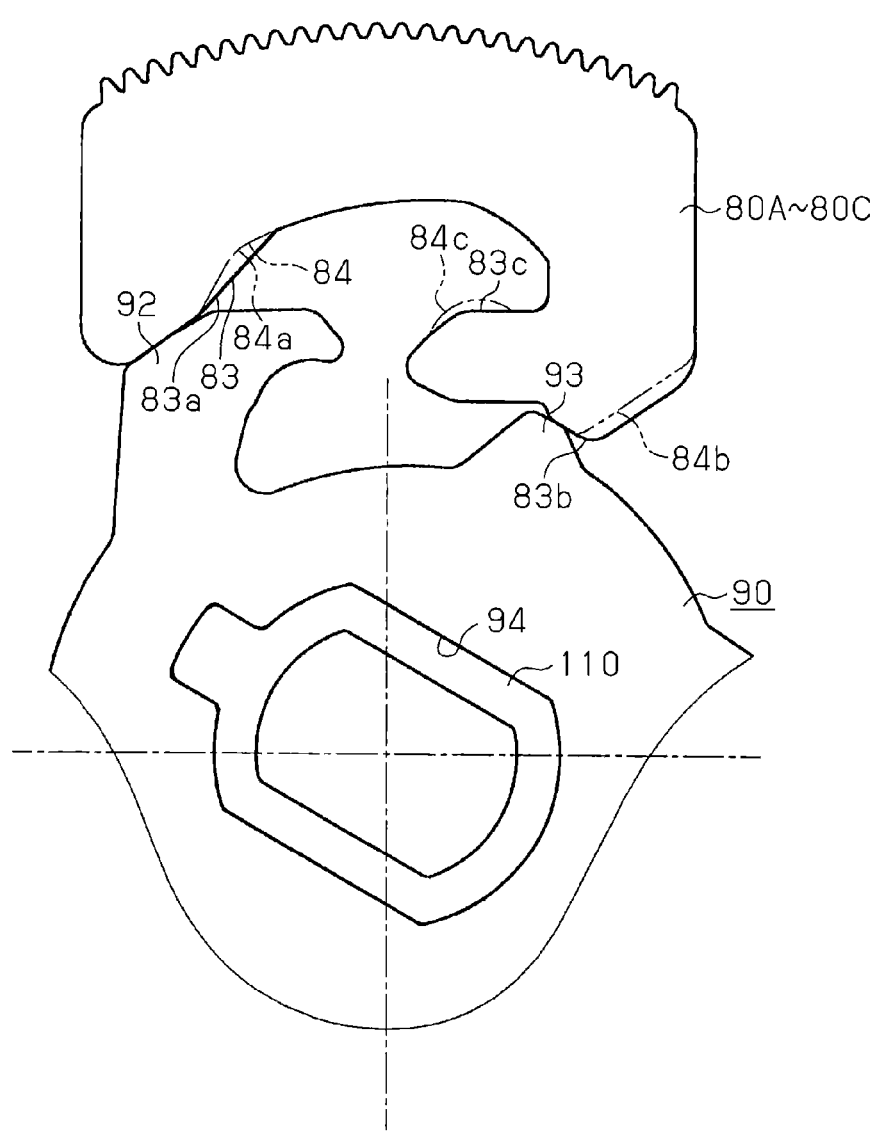
FIG. 8 is an enlarged view of the engagement structure between a pole and a cam.

As indicated by a solid line in FIG. 8, an inner surface cam portion 83, which is engaged with an outer circumferential portion of the cam 90, is formed on an inner end of the pole 80A (end surface opposite to the outer end). The inner surface cam portion 83 is formed by two pole side cam surfaces 83a and 83b, which are arranged in the counterclockwise rotational direction and the clockwise rotational direction of the pole 80A in FIG. 8, and a hooked portion 83c, which is arranged inside a gate-like portion formed by the two pole side cam surfaces 83a and 83b.

As indicated by the double-dashed line in FIG. 8, an inner surface cam portion 84, which is engaged with the outer circumferential portion of the cam 90, is formed at an inner end of each of the poles 80A to 80C. The inner surface cam portion 84 is formed by a pair of pole side cam surfaces 84a and 84b, arranged in the counterclockwise and clockwise rotation directions of the two poles 80B and 80C in FIG. 8, and a hooked portion 84c, arranged inside a gate-shape portion formed by the two pole side cam surfaces 84a and 84b.

The cam 90 is formed by, for example, performing press work of a steel plate, and is a flat plate free from steps. As shown in FIG. 6B, the cam 90 is rotatable about the rotation axis O1 within the range in which the guide groove 75 of the lower arm 71 and the recess 21 of the upper arm 76 are formed in the axial direction (that is, within the range in which the three poles 80A to 80C are arranged in the axial direction). The central portion of the cam 90 includes a substantially key-hole like cam fitting hole 94.

The peripheral portion of the cam 90 includes three sets of cam surfaces 91 arranged at equal angular intervals on a circumference. As shown in FIG. 6A, each cam surface 91 includes a substantially triangular shoulder portion 93, which is arranged in the clockwise rotation direction of the cam 90, and a hook 92, which is arranged in the counterclockwise rotation direction of the cam 90.

The hook 92 and the shoulder portion 93 of each cam surface can come in contact with the opposing two pole side cam surfaces 83a and 83b of the pole 80A or the facing two pole side cam surfaces 84a and 84b of the poles 31B and 31C. The hook 92 and the shoulder portion 93 press the corresponding two pole side cam surfaces 83a and 83b or the corresponding two pole side cam surfaces 84a and 84b when the cam 90 rotates to the lock position. More specifically, the hook 92 and the shoulder portion 93 are retained at angular positions where they come in contact with (contact under pressure) the two corresponding pole side cam surfaces 83a and 83b of the pole 80A or the two corresponding pole side cam surfaces 84a and 84b of the poles 31B and 31C when the cam 90 rotates to the lock position.

As shown in FIG. 8, the hook 92 and the shoulder portion 93 press the corresponding two pole side cam surfaces 83a and 83b of the pole 80A and the two pole side cam surfaces 84a and 84b of the poles 31B and 31C as the cam 90 rotates counterclockwise as viewed in the drawing. This pushes out the poles 80A to 80C along the guide grooves 75 of the lower arm 71 in the radially outward direction. When the external teeth 82 of the pole 80A do not face the toothless portion 78 of the upper arm 76 in the radial direction, the external teeth 82 of all the poles 80A to 80C are allowed to engage with the internal teeth 22 of the upper arm 76.

When the three poles 80A to 80C are pushed out along the guide grooves 75 of the lower arm 10 in the radially outward direction, the external teeth 82 of the pole 80A may face the toothless portion 78 of the upper arm 76 in the radial direction. In this case, movement of the pole 80A in the radially outward direction is restricted, and rotation of the cam 90 is stopped. This prohibits engagement of the external teeth 82 of all the poles 80A to 80C with the internal teeth 22 of the upper arm 76.

As shown in FIG. 8, as the cam 90 rotates clockwise as viewed in the drawing, the hooked portion 83c of the pole 80A or the hooked portions 84c of the poles 31B and 31C may be engaged with each hook 92 of the cam 90. In this case, the cam 90 pulls the poles 80A to 80C along the guide grooves 75 of the lower arm 71 in the radially inward direction. This causes the external teeth 82 of the poles 80A to 80C to be disengaged from the internal teeth 22 of the upper arm 76. At the same time, the hook 92 and the shoulder portion 93 are separated from the corresponding two pole side cam surfaces 83a and 83b of the pole 80A or from the corresponding two pole side cam surfaces 84a and 84b of the poles 31B and 31C.

A hinge cam 110, which has an axis extending along the rotation axis O1, is fitted into the cam fitting hole 94 of the cam 90. More specifically, the hinge cam 110, which is contoured to form a substantially key hole, is inserted through the lower arm 71 (through-hole 71a) and fitted in the cam fitting hole 94 of the cam 90 supported on the lower arm 71 in a freely rotatable manner. This allows the cam 90 to be coupled to the hinge cam 110 in an integrally rotatable manner.

As shown in FIG. 7, the coil spring 120 includes an inner circumferential side leg portion 120b, which is engaged with the hinge cam 110, and an outer circumferential side leg portion 120a, which is engaged with the lower arm 71. The coil spring 120 rotates and biases the hinge cam 110 in one direction to move the poles 80A to 80C through the cam 90 in the radial direction in which the external teeth 82 of each pole and the internal teeth portion 77 (internal teeth 22) are engaged with each other or the external teeth 82 of each pole and the toothless portion 78 come in contact with each other.

The hinge cam 110 rotates in the direction opposite to the direction in which the biasing force is applied from the coil spring 120 when a release operation force is input from the operation member (not shown). The hinge cam 110 moves the poles 80A to 80C through the cam 90 in the radial direction in which the external teeth 82 and the internal teeth 22 are disengaged from each other.

The relationship between the rotation angle (θ) of the cam 90, which serves as the origin when the external teeth 82 of the poles 80A to 80C are engaged with the internal teeth 22 of the upper arm 76 under the biasing force from the coil spring 120, and the sliding amounts (S and S'), which are the amounts of movement of the corresponding poles 80A to 80C in the radial direction in which the poles 80A to 80C are separated from the internal teeth 22, is the same as in the first embodiment (refer to FIG. 4). In the present embodiment, the different profiles of the sliding amounts S and S' during rotation of the cam 90 in the unlocking direction result from the shapes of the hooked portions 83*c* and 84*c*, which are engaged with the hooks 92 of the cam 90. The different profiles of the sliding amounts S and S' during rotation of the cam 90 in the locking direction result from the shapes of the pole side cam surfaces 83*a* and 84*a*, which are engaged with the hooks 92 of the cam 90, and the shapes of the pole side cam surfaces 83*b* and 84*b*, which are engaged with the shoulder portions 93.

The operation of the present embodiment will now be described

As shown in FIG. 6A, when the seat reclining device 70 is locked, the coil spring 120 rotates and biases the cam 90 counterclockwise as viewed in the drawing so that the shoulder portions 93 of the cam 90 come in contact with the pole side cam surfaces 83*b* and 84*b* of the inner surface cam portions 83 and 84 of the poles 80A to 80C and the hooks 92 of the cam 90 to come in contact with the pole side cam surfaces 83*a* and 84*a* of the inner surface cam portions 83 and 84 of the poles 80A to 80C to press the poles 80A to 80C in the radially outward direction. This engages the external teeth 82 of each of the poles 80A to 80C with each internal teeth portion 77 (internal teeth 22) of the upper arm 76 and restricts rotation of the upper arm 76 relative to the lower arm 71, and restricts (locks) rotation of the seat back 132 relative to the seat cushion 131.

When the operation handle is operated under this situation to integrally rotate the hinge cam 110 and the cam 90 against the biasing force applied from the coil spring 120, the shoulder portions 93 of the cam 90 are disengaged from the pole side cam surfaces 83*b* and 84*b* of the poles 80A to 80C, and the hooks 92 of the cam 90 are disengaged from the pole side cam surfaces 83*a* and 84*a* of the poles 80A to 80C. With the hooked portions 83*c* and 84*c* of the poles 80A to 80C and the hooks 92 of the cam 90 being engaged with each other, the poles 80A to 80C are pulled along the two guide walls 73 and 74 toward the rotation axis O1. This disengages the external teeth 82 of the poles 80A to 80C from the internal teeth portion 77 (internal teeth 22).

As a result, rotation of the upper arm 76 relative to the lower arm 71 is permitted, and rotation of the seat back 132 relative to the seat cushion 131 is permitted (unlocked). This allows the seat back 132 to be rotated to any angular position relative to the seat cushion 131.

When the vehicle seat reclining device 70 is unlocked and the seat back 132 is rotated relative to the seat cushion 131 in the frontward direction by a predetermined angle or greater, that is, to the forward folding angular range, the toothless portion 78 formed on the upper arm 76 faces the external teeth 82 of the pole 80A in the radial direction. As a result, the external teeth 82 of the pole 80A are engaged with the toothless portion 78 of the upper arm 76 to restrict movement of the pole 80A in the radially outward direction. When the force applied to the operation member is released in this state, the coil spring 120 rotates and biases the cam 90 counterclockwise as viewed in the drawing so that the shoulder portions 93 of the cam 90 press the pole side cam surfaces 83*b* and 84*b* of the poles 80A to 80C, and the hooks 92 press the pole side cam surfaces 83*a* and 84*a* of the poles 80A to 80C. However, the movement of all the poles 80A to 80C is restricted by the engagement of the toothless portion 78 of the upper arm 76 and the external teeth 82 of the pole 80A. Thus, the poles cannot be engaged. Within the forward folding angular range, the seat back 132 is unlocked and freely rotatable.

Unlocking force is applied to the operation member in the forward-folded state to return the seat back 132 to a position optimum for seating. When the force is released at that position, the three poles 80A to 80C and the cam 90 return to the state shown in FIG. 6A and are locked.

As described in detail above, the present embodiment has the advantages described below in addition to the advantages (1) to (6) described in the first embodiment.

(1) In the present embodiment, the cam 90 (cam body) can solely cause the external teeth 82 of the plurality of pole 80A to 80C to be engaged with or disengaged from the internal teeth 22 by simply switching the direction of rotation of the cam 90. This reduces the number of components of the cam 90 (cam unit).

The above embodiments may be modified in the following forms.

In the first embodiment, the engagement relationship of the pole 31A with the cam 32 and the pole 31B or the pole 31C with the release plate 33 may be reversed.

In the first embodiment, the upper arm 20 may include any number of protrusions 24.

In the second embodiment, the upper arm 76 may include any number of toothless portions 78.

In each of the above embodiments, the lower arms 10 and 71 may include any number of poles more than one pole. The lower arms 10 and 71 only need to include both the first pole, of which radial movement is directly restricted relative to the upper arm, and the second pole, of which radial movement is indirectly restricted relative to the upper arm. When the lower arms 10 and 71 include a plurality of first poles or second poles, the first poles or the second poles may have identical or different shapes.

In each of the above embodiments, the sliding amounts S and S' of the first pole and the second pole may be set by using the cam surfaces of the cam bodies instead of or in addition to the inner surface cam portions of the poles.

In the above embodiments, the fixing relationship of the lower arms 10 and 71 and the upper arms 20 and 76 may be reversed at the side of the seat cushion 131 and the side of the seat back 132.

DESCRIPTION OF REFERENCE CHARACTERS 1, 70 vehicle seat reclining device
10, 71 lower arm (first arm)
15, 75 guide groove
20, 76 upper arm (second arm)
22 first teeth, internal teeth
24 protrusion (restricting member)
31A, 80A pole (first pole)
31B, 31C, 80B, 80C pole (second pole)
32 cam forming cam body
33 release plate forming cam body
34, 120 coil spring (biasing member)
43 engagement unit (restricting member)
44, 47, 82 second teeth, external teeth
45 inner surface cam portion (first locking-side pole cam)
46 pole side groove cam portion (first unlocking-side pole cam)
48 inner surface cam portion (second locking-side pole cam)
49 engagement protrusion (second unlocking-side pole cam)
55 cam surface (first locking-side cam portion, second locking-side cam portion)
57 engagement protrusion (first unlocking-side cam portion)

59 release plate side groove cam portion (second unlocking-side cam portion)
78 toothless portion (restricting member)
83c hooked portion (first hooked portion)
84c hooked portion (second hooked portion)
90 cam body used as cam
92 hook (first hook, second hook)
130 vehicle seat
131 seat cushion
132 seat back

The invention claimed is:

1. A vehicle seat reclining device arranged on a vehicle seat including a seat cushion and a seat back, the vehicle seat reclining device comprising:
   a first arm fixed to one of the seat cushion and the seat back of the vehicle seat, wherein the first arm includes a plurality of guide grooves;
   a second arm fixed to the other one of the seat cushion and the seat back of the vehicle seat and supported by the first arm in a rotatable manner, wherein the second arm includes internal teeth;
   first and second poles respectively guided by the plurality of guide grooves to be movable in a radial direction, wherein each of the first and second poles includes external teeth that are engageable with and disengageable from the internal teeth of the second arm;
   a cam body engaged with the first and second poles, wherein the cam body presses the first and second poles outwardly during a locking operation performed when rotated in a first direction to engage the internal teeth with the external teeth, and the cam body pulls the first and second poles inwardly during an unlocking operation performed when rotated in a second direction to disengage the internal teeth from the external teeth; and
   a restricting member arranged between the first pole and the second arm, wherein the restricting member restricts radially outward movement of the first pole when a relative rotation angle of the first arm and the second arm is within a predetermined range to prohibit engagement of the external teeth of the first pole and the internal teeth, wherein
   when the restricting member restricts radially outward movement of the first pole and restricts rotation of the cam body, engagement of the external teeth with the internal teeth is prohibited in the second pole, and
   when the first pole reaches a position corresponding to an engagement prohibition state of the external teeth and the internal teeth caused by the restricting member during an unlocking operation, a movement amount by which the second pole moves away from the internal teeth in the radial direction is set to be greater than a movement amount by which the first pole moves away from the internal teeth in the radial direction.

2. The vehicle seat reclining device according to claim 1, wherein a distance by which the second pole moves away in the radial direction from the internal teeth when the first pole is in the engagement prohibition state of the external teeth and the internal teeth due to the restricting member during a locking operation is set to be larger than a distance by which the first pole moves away in the radial direction from the internal teeth.

3. The vehicle seat reclining device according to claim 2, wherein an angle difference is set between the rotation angle of the cam body when the cam body starts pressing the first pole and the rotation angle of the cam body when the cam body starts pressing the second pole to delay operation of the second pole from operation of the first pole during the locking operation.

4. The vehicle seat reclining device according to claim 2, wherein the rotation angle of the cam body when the first pole is in the engagement prohibition state of the external teeth and the internal teeth due to the restricting member during the locking operation is greater than or equal to the rotation angle of the cam body when the second pole reaches a position of the first pole corresponding to the engagement prohibition state of the external teeth and the internal teeth caused by the restricting member during the unlocking operation.

5. The vehicle seat reclining device according to claim 2, wherein the rotation angles of the cam body corresponding to the amounts by which the first pole and the second pole move away from the internal teeth in the radial direction converge and become equal at a point of time when tips of the external teeth of each of the first pole and the second pole are engaged with tips of the internal teeth.

6. The vehicle seat reclining device according to claim 1, wherein
   the first pole includes a first unlocking-side pole cam portion,
   the second pole includes a second unlocking-side pole cam portion, and
   the cam body includes
      a cam engaged with the first and second poles, wherein the cam presses each of the first and second poles outwardly during rotation in the first direction and engages the internal teeth with the external teeth,
      a release plate coupled to the cam to rotate integrally with the cam,
      a first unlocking-side cam portion formed on the cam, wherein the first unlocking-side cam portion pulls the first unlocking-side pole cam portion of the first pole during rotation in the second direction and disengages the external teeth of the first pole from the internal teeth, and
      a second unlocking-side cam portion formed on the release plate, wherein the second unlocking-side cam portion pulls the second unlocking-side pole cam portion of the second pole during rotation in the second direction to disengage the external teeth of the second pole from the internal teeth.

7. The vehicle seat reclining device according to claim 1, wherein
   the first pole includes a first hooked portion,
   the second pole includes a second hooked portion, and
   the cam body includes a plate-shaped cam, and
   the cam includes a first hook and a second hook that disengage the external teeth of each of the first and second poles from the internal teeth by respectively hooking the first hooked portion of the first pole and the second hooked portion of the second pole during rotation in the second direction.

8. A seat reclining device for use in a vehicle including a seat cushion and a seat back, the seat reclining device comprising:
- a first arm fixed to one of the seat cushion and the seat back, wherein the first arm includes a plurality of guide grooves and is circular;
- a second arm fixed to the other one of the seat cushion and the seat back and supported by the first arm in a rotatable manner, wherein the second arm includes first teeth;
- first and second poles respectively guided by the plurality of guide grooves to move in a radial direction of the first arm, wherein each of the first and second poles includes second teeth that are engageable with and disengageable from the first teeth of the second arm;
- a cam body supported by the second arm in a rotatable manner, wherein the cam body is engaged with the poles, and the cam body moves to a lock position when rotated in a first direction, at which the first teeth is engaged with the second teeth by pressing the poles outwardly in the radial direction of the first arm, and an unlock position when rotated in a second direction that differs from the first direction, at which the first teeth is disengaged from the second teeth by moving the poles inward in the radial direction of the first arm;
- a restricting member arranged between the first pole and the second arm, wherein the restricting member restricts outward movement of the first pole in the radial direction of the first arm when a relative rotation angle of the first arm and the second arm is within a predetermined range to prohibit engagement of the first teeth and the second teeth, wherein when outward movement of the first pole in the radial direction of the first cam is restricted, movement of the cam body is restricted, and engagement of the second teeth of the second pole with the first teeth is prohibited, and when the cam body moves to the unlock position and the first pole reaches a position corresponding to an engagement prohibition state of the first teeth and the second teeth caused by the restricting member, a movement amount of the second pole by which the second pole moves away from the first teeth in the radial direction of the first arm is set to be greater than a movement amount of the first pole by which the first pole moves away from the first teeth in the radial direction.

* * * * *